United States Patent
Kweon et al.

(10) Patent No.: US 10,075,414 B2
(45) Date of Patent: Sep. 11, 2018

(54) METHOD AND APPARATUS FOR PROVIDNG PUSH SERVICE IN COMMUNICATION SYSTEM

(71) Applicant: Samsung Electronics Co., Ltd., Gyeonggi-do (KR)

(72) Inventors: Ki-Suk Kweon, Gyeonggi-do (KR); Jung-Shin Park, Seoul (KR); Yeong-Moon Son, Gyeonggi-do (KR); Antony Franklin, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 221 days.

(21) Appl. No.: 15/021,939

(22) PCT Filed: Sep. 11, 2014

(86) PCT No.: PCT/KR2014/008459
§ 371 (c)(1),
(2) Date: Mar. 14, 2016

(87) PCT Pub. No.: WO2015/037909
PCT Pub. Date: Mar. 19, 2015

(65) Prior Publication Data
US 2016/0234164 A1    Aug. 11, 2016

(30) Foreign Application Priority Data
Sep. 13, 2013   (KR) .................. 10-2013-0110699

(51) Int. Cl.
*H04L 12/28* (2006.01)
*H04L 29/12* (2006.01)
(Continued)

(52) U.S. Cl.
CPC ...... *H04L 61/2521* (2013.01); *H04L 61/2503* (2013.01); *H04L 61/2567* (2013.01);
(Continued)

(58) Field of Classification Search
CPC ......... H04L 41/12; H04L 45/02; H04L 45/00; H04L 45/04; H04L 41/04
See application file for complete search history.

(56) References Cited

U.S. PATENT DOCUMENTS

| | | | |
|---|---|---|---|
| 8,780,796 B1 * | 7/2014 | Ballal | H04W 76/12 370/328 |
| 2005/0004968 A1 * | 1/2005 | Mononen | H04L 63/0823 709/200 |

(Continued)

FOREIGN PATENT DOCUMENTS

| KR | 10-2012-0125349 A | 11/2012 |
|---|---|---|
| KR | 10-2012-0015734 A | 1/2013 |

(Continued)

OTHER PUBLICATIONS

International Search Report dated Jan. 6, 2015 in connection with International Application No. PCT/KR2014/008459; 5 pages.

(Continued)

*Primary Examiner* — Siren Wei

(57) ABSTRACT

A method and a system are provided for a push service in a communication system. The method comprises: if there is data that is directed from an application server to an application of a terminal, transmitting, to a location register, a first message requesting location information of the terminal; if the location register receives the first message, transmitting, to a gateway, a second message requesting the location information of the terminal; transmitting, to the location register by the gateway, a third message including the location information of the terminal; transmitting, to the application server by the location register, a fourth message including the location information of the terminal; and transmitting, to the application of the terminal by the application server, the data using the location information of the terminal.

15 Claims, 23 Drawing Sheets

(51) Int. Cl.
*H04W 8/08* (2009.01)
*H04L 29/08* (2006.01)
*H04W 4/02* (2018.01)
*H04W 8/04* (2009.01)
*H04W 88/16* (2009.01)

(52) U.S. Cl.
CPC .......... *H04L 67/141* (2013.01); *H04L 67/143* (2013.01); *H04L 67/26* (2013.01); *H04W 4/025* (2013.01); *H04W 8/04* (2013.01); *H04W 8/08* (2013.01); *H04L 61/2514* (2013.01); *H04L 61/2517* (2013.01); *H04L 61/2557* (2013.01); *H04W 88/16* (2013.01)

(56) References Cited

U.S. PATENT DOCUMENTS

| | | |
|---|---|---|
| 2007/0027832 A1 | 2/2007 | Fiatal et al. |
| 2007/0104205 A1* | 5/2007 | Baik ................ H04L 29/12066 370/395.3 |
| 2010/0088387 A1 | 4/2010 | Calamera |
| 2011/0280254 A1* | 11/2011 | Shi .......................... H04W 8/02 370/401 |
| 2011/0289172 A1 | 11/2011 | Marcellino |
| 2012/0320876 A1 | 12/2012 | Zhou et al. |
| 2013/0097329 A1* | 4/2013 | Alex ................... H04L 61/1511 709/228 |
| 2013/0136096 A1 | 5/2013 | Lee et al. |
| 2014/0019578 A1 | 1/2014 | Lim et al. |
| 2014/0148158 A1 | 5/2014 | Cho et al. |

FOREIGN PATENT DOCUMENTS

| | | |
|---|---|---|
| KR | 10-2013-0005734 A | 1/2013 |
| WO | WO 2012/128487 A2 | 2/2012 |

OTHER PUBLICATIONS

Written Opinion of the International Searching Authority dated Jan. 6, 2015 in connection with International Application No. PCT/KR2014/008459; 7 pages.

* cited by examiner

METHOD AND APPARATUS FOR PROVIDNG PUSH SERVICE IN COMMUNICATION SYSTEM

CROSS-REFERENCE TO RELATED APPLICATIONS AND CLAIM OF PRIORITY

The present application claims priority under 35 U.S.C. § 365 to International Patent Application No. PCT/KR2014/002712 filed Mar. 31, 2014, entitled "METHOD AND APPARATUS FOR DEVICE-TO-DEVICE COMMUNICATION", and, through International Patent Application No. PCT/KR2014/002712, to Korean Patent Application No. 10-2013-0034530 filed Mar. 29, 2014, each of which are incorporated herein by reference into the present disclosure as if fully set forth herein.

BACKGROUND DISCLOSURE

1. Field of the Disclosure

The present disclosure relates to a method and apparatus for acquisition of a public IP (Internet Protocol) address of a mobile station in order to provide a push service, in a communication system.

2. Description of the Related Art

A push service is a service in which, when update data is generated, an application server transmits the corresponding data to a mobile station without a request of the mobile station. Through this, when new data is generated, the mobile station can receive the data.

In order that the push service is made possible, the application server must be able to first set an IP session to the mobile station. That is, if there is data to be transmitted to the mobile station, the application server must be able to first set an IP session to the mobile station and transmit the data to the mobile station.

However, a mobile network service provider cannot secure a sufficient number of public IP addresses due to several problems. Instead, the mobile network service provider installs, in a network of the mobile network service provider, a gateway that uses a NAT (Network Address Translation) technology, and allocates private IP addresses to mobile stations within the network.

The mobile station within the mobile network service provider network can set up IP sessions with mobile stations outside the mobile network service provider network, using the allocated private IP addresses, and perform communication with the mobile stations outside the mobile network service provider network.

However, due to the private IP allocation, equipment outside the mobile network service provider network cannot first set an IP session to the mobile station within the mobile network service provider network. It is because the private IP address is an effective IP address only within the mobile service provider network.

To address this problem, the application server sets up a continuous IP session with the mobile station and provides a push service through this. To maintain the continuous IP session, the mobile station transmits a keep alive message to the application server by periods. The keep alive message enables the gateway to refresh a NAT table by periods and enables the IP session to be kept being continued.

However, this generates a signaling overhead and is the cause of wireless resource waste. If an N number of mobile stations and an M number of application servers exist, an M×N number of continuous IP sessions exist between the mobile stations and the application servers, and signaling generated to maintain the continuous IP session is a big burden to the network.

Also, because even the mobile station has to transmit the keep alive message by periods so as to maintain the M×N number of continuous IP sessions, there is a problem in which wireless resource waste and power consumption are great.

SUMMARY

Accordingly, an object of the present disclosure is to provide a method and apparatus for push service provision in a communication system.

Another object of the present disclosure is to provide a method and apparatus making a push service possible even without a continuous IP session in a communication system.

A further object of the present disclosure is to provide a method and apparatus notifying a public IP address on request in a communication system.

According to a first aspect of the present disclosure, in a method for providing a push service in a communication system, the method includes the processes of, in an application server, in case where incoming data for a mobile station exists, transmitting, to a location register, a first message for a query of an IP address of the mobile station, in case where the location register receives the first message, transmitting, to a gateway, a second message requesting a NAT (Network Address Translation) table entry of the mobile station, transmitting, to the location register by the gateway, a third message for the NAT table entry of the mobile station, transmitting, to the application server by the location register, a fourth message for the query of the IP address of the mobile station, and transmitting, by the application server, the incoming data to the mobile station, based on information included in the fourth message.

According to a second aspect of the present disclosure, in a communication system for providing a push service, the system includes an application server of, in case where incoming data for a mobile station exists, transmitting, to a location register, a first message for a query of an IP address of the mobile station, the location register of, in case of receiving the first message, transmitting, to a gateway, a second message requesting a NAT (Network Address Translation) table entry of the mobile station, and the gateway of transmitting, to the location register, a third message for the NAT table entry of the mobile station, and the location register may transmit, to the application server, a fourth message for the query of the IP address of the mobile station, and transmit, by the application server, the incoming data to the mobile station, based on information included in the fourth message.

According to a third aspect of the present disclosure, in a method for operating a location register in a communication system, the method includes the processes of receiving, from an application server, a first message requesting location information of a mobile station, transmitting, to a gateway, a second message requesting the location information of the mobile station, receiving, from the gateway, a third message including the location information of the mobile station, and transmitting, to the application server, a fourth message including the location information of the mobile station.

According to a fourth aspect of the present disclosure, in an apparatus of a location register in a communication system, the apparatus includes at least one processor, a memory, a communication processing unit communicating with another node, and at least one program stored in the memory and driven by the one or more processors, and the program receives, from an application server, a first message requesting location information of a mobile station through the communication processing unit, transmits, to a gateway, a second message requesting the location information of the mobile station, receives, from the gateway, a third message including the location information of the mobile station, and transmits, to the application server, a fourth message including the location information of the mobile station.

According to a fifth aspect of the present disclosure, in a method for operating a gateway in a communication system, the method includes the processes of receiving a first message requesting location information of a mobile station from a location register, determining location information of the mobile station, and transmitting, to the location register, a second message including the location information of the mobile station.

According to a sixth aspect of the present disclosure, in an apparatus of a gateway in a communication system, the apparatus includes at least one processor, a memory, a communication processing unit communicating with another node, and at least one program stored in the memory and driven by the one or more processors, and the program receives a first message requesting location information of a mobile station from a location register through the communication processing unit, and determine the location information of the mobile station, and transmit, to the location register, a second message including the location information of the mobile station.

Because the system present disclosure does not continuously maintain an IP session, there is an advantage capable of preventing a network signaling overhead caused by a continuous IP session and a wireless resource waste.

BRIEF DESCRIPTION OF THE DRAWINGS

The above and other objects, features and advantages of the present disclosure will become more apparent from the following detailed description when taken in conjunction with the accompanying drawings in which.

DETAILED DESCRIPTION

Preferred embodiments of the present disclosure will be described herein below with reference to the accompanying drawings. In describing the present disclosure, well-known functions or constructions are not described in detail since they would obscure the subject matter of the present disclosure in unnecessary detail. And, terms described below are terms defined considering functions in the present disclosure, and these can vary according to mobile station, operator's intention or practice, etc. Therefore, the definition should be given on the basis of the content throughout the present specification.

Below, the present disclosure describes about a method and apparatus for push service provision in a communication system. In the following description, an electronic device includes a mobile communication terminal, a PDA (Personal Digital Assistant), a laptop, a smart phone, a netbook, a television, a MID (Mobile Internet Device), a UMPC (Ultra Mobile PC), a tablet PC (Tablet Personal Computer), a navigation, and an MP3, etc.

Figure 1:
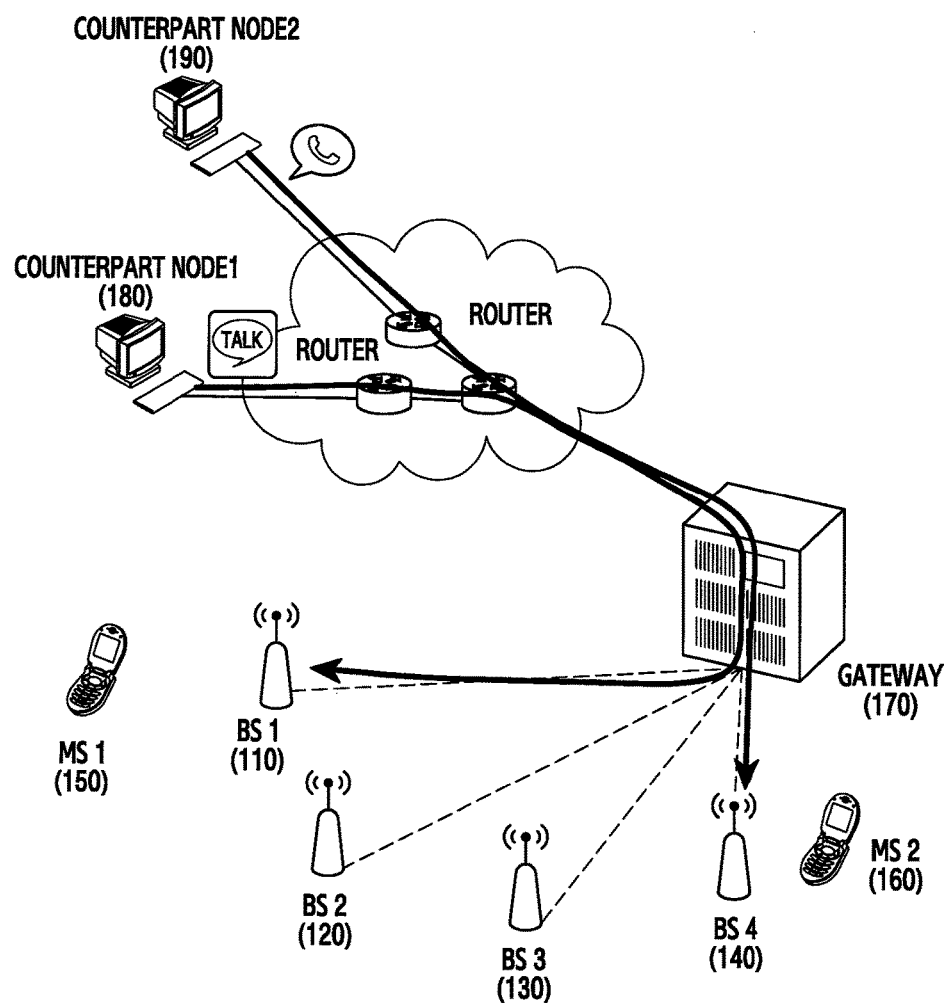
FIG. 1 is a diagram illustrating an IP reachability according to the present disclosure.

FIG. 1 is a diagram illustrating an IP reachability according to the present disclosure.

Referring to the FIG. 1, the IP reachability indicates an ability in which equipment outside a mobile service provider network may set an IP session to a mobile station within the mobile service provider network. For this, the external device has to be aware of a public IP address of the mobile station within the network.

Counterpart nodes1, 2 180, 190 first set up IP sessions with mobile stations1, 2 150, 160 respectively through a gateway 170 and thereafter, transmit KaKao Talk packets or VOIP (Voice Over IP) packets to the mobile stations1, 2 150 160, respectively. The mobile station1, 2 150, 160 may be connected to one base station among base stations1, 2, 3, 4 110, 120, 130, 140.

If a private IP address is allocated to the mobile station1, 2 150, 160, the gateway 170 must use a NAT technology in order for the mobile station1, 2 150, 160 to communicate with the external node.

Figure 2:
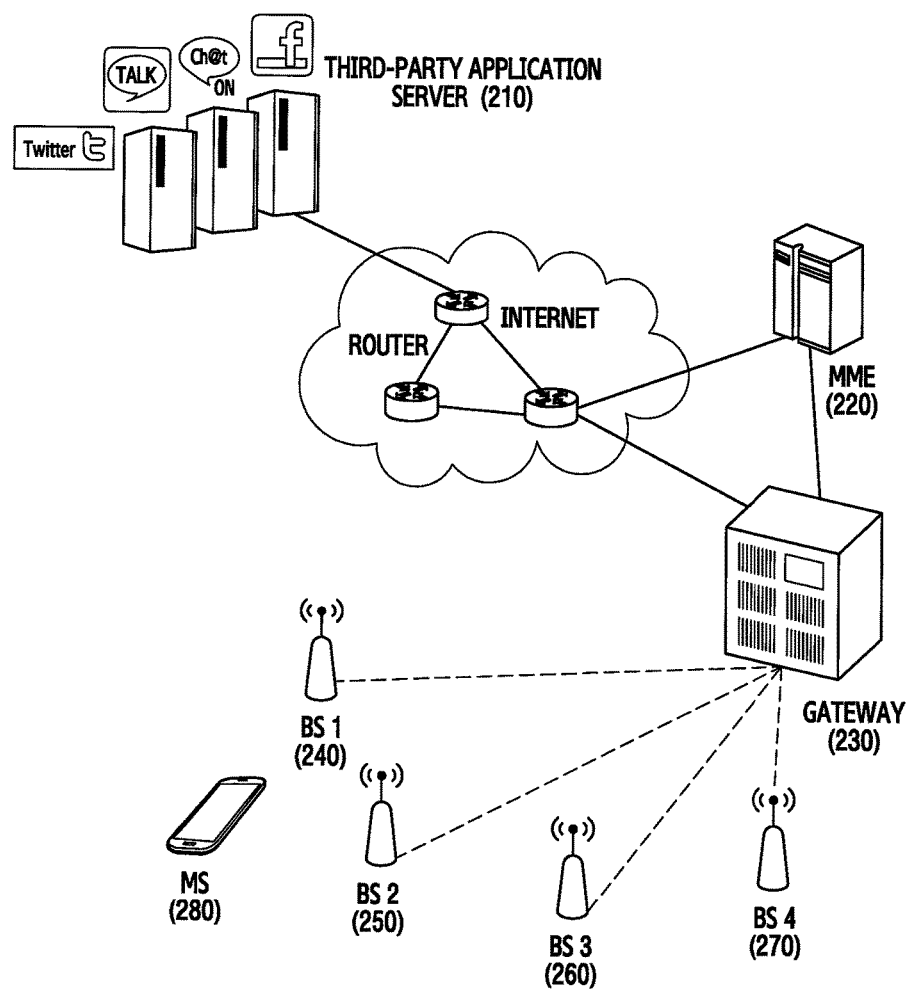
FIG. 2 is a diagram illustrating a network structure for a push service according to an exemplary embodiment of the present disclosure.

FIG. 2 is a diagram illustrating a network structure for a push service according to an exemplary embodiment of the present disclosure.

Referring to the FIG. 2, a third-party application server 210 must be aware of a public IP address of a mobile station 280 so as to first set up an IP session with the mobile station 280.

In the present disclosure, if an MME (Mobility Management Entity) (or Location Register) 220 receives a message requesting a public IP address of the mobile station 280 from the third-party application server 210, the MME 220 requests, to a gateway 230, a public IP address of the mobile station 280 and acquires the requested public IP address and then provides the acquired public IP address to the third-party application server 210. The mobile station 280 may be connected to one base station among base station1, 2, 3, 4 240, 250, 260, 270.

Figure 3A:
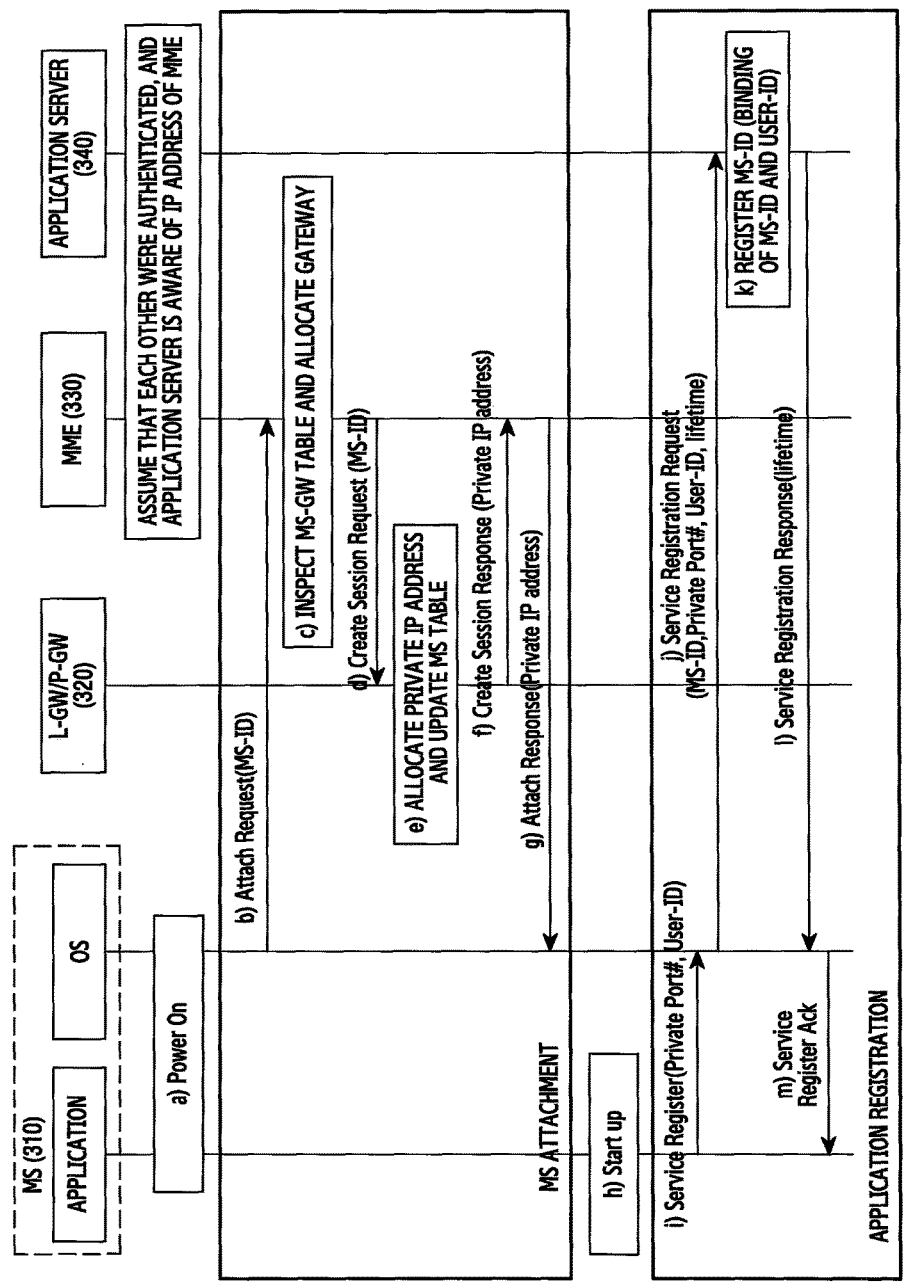
FIG. 3A is a message flow diagram illustrating an attach process of a mobile station according to an exemplary embodiment of the present disclosure.

FIG. 3A is a message flow diagram illustrating an attachment process of a mobile station according to an exemplary embodiment of the present disclosure.

Referring to the FIG. 3A, an application of the mobile station 310 and an OS (Operating System) thereof are located in the mobile station 310. After the mobile station 310 powers on (step a), the mobile station 310 performs an attachment process with an MME 330. For this, the OS of the mobile station 310 transmits an Attach Request message to the MME 330 (step b). The Attach Request message includes an MS-ID that is an ID of the mobile station 310. Also, the MME 330 may allocate the MS-ID. The MS-ID indicates a unique identifier of the mobile station 310 and, for one example, may be a phone number of the mobile station 310. However, the MS-ID is not limited to the phone number, and its example would not have limitations.

Thereafter, the MME 330 inspects an MS-GW table and allocates a gateway 320 that the mobile station 310 may gain access to (step c).

Thereafter, the MME 330 transmits a Create Session Request message to the allocated gateway 320 and requests session creation for the mobile station 310 to the allocated gateway 320 (step d). The Create Session Request message includes an MS-ID of the mobile station 310.

Thereafter, the gateway 320 allocates a private IP address of the mobile station 310, and updates an MS table (step e). The MS table is a binding of the MS-ID of the mobile station 310 and the private IP address allocated to the mobile station 310.

Thereafter, the gateway 320 transmits a Create Session Response message to the MME 330 and transmits a response to the session creation request to the MME 330 (step f). The Create Session Response message includes a private IP address allocated to the mobile station 310.

Thereafter, the MME 330 transmits an Attach Response message to the OS of the mobile station 310 and notifies the OS of the mobile station 310 of a success of the attachment request and the private IP address allocated to the mobile station 310 (step g). The Attach Accept message includes the private IP address allocated to the mobile station 310.

Thereafter, if the application of the mobile station 310 is executed (step h), the application of the mobile station 310 transmits a Service Register message to the OS of the mobile station 310 and requests a service registration to the OS of the mobile station 310. The Service Register message includes a private port number and a User-ID (step i).

The private port number indicates a port number generated when the application of the mobile station 310 performs socket binding, and the User-ID indicates an ID of a user, used in the application.

Thereafter, the OS of the mobile station 310 transmits a Service Registration Request message to an application server 340 and requests a registration of the mobile station 310 and a user of the mobile station 310 to the application server 340 (step j).

The Service Registration Request message includes an MS-ID of the mobile station 310, a private port number, a User-ID, a lifetime. The lifetime indicates a binding effective time of the User-ID of an MS-User Table used in the application server 340, the MS-ID, an IP address (public IP address), and is a value capable of being set by an application provider.

Thereafter, the application server 340 registers the MS-ID of the mobile station 310 (step k). This registration process indicates a binding of the MS-ID of the mobile station 310, the User-ID. The binding may include a binding of the IP address (public IP address) and the lifetime which are included in the Service Registration Request message.

Thereafter, the application server 340 transmits, to the OS of the mobile station 310, a Service Registration Response message that is a response message to the Service Registration Request message (step l). The Service Registration Response message includes the lifetime.

Thereafter, the OS of the mobile station 310 transmits a Service Register Ack message that is a response message to the Service Register message, to the application of the mobile station 310 (step m).

Figure 3B:
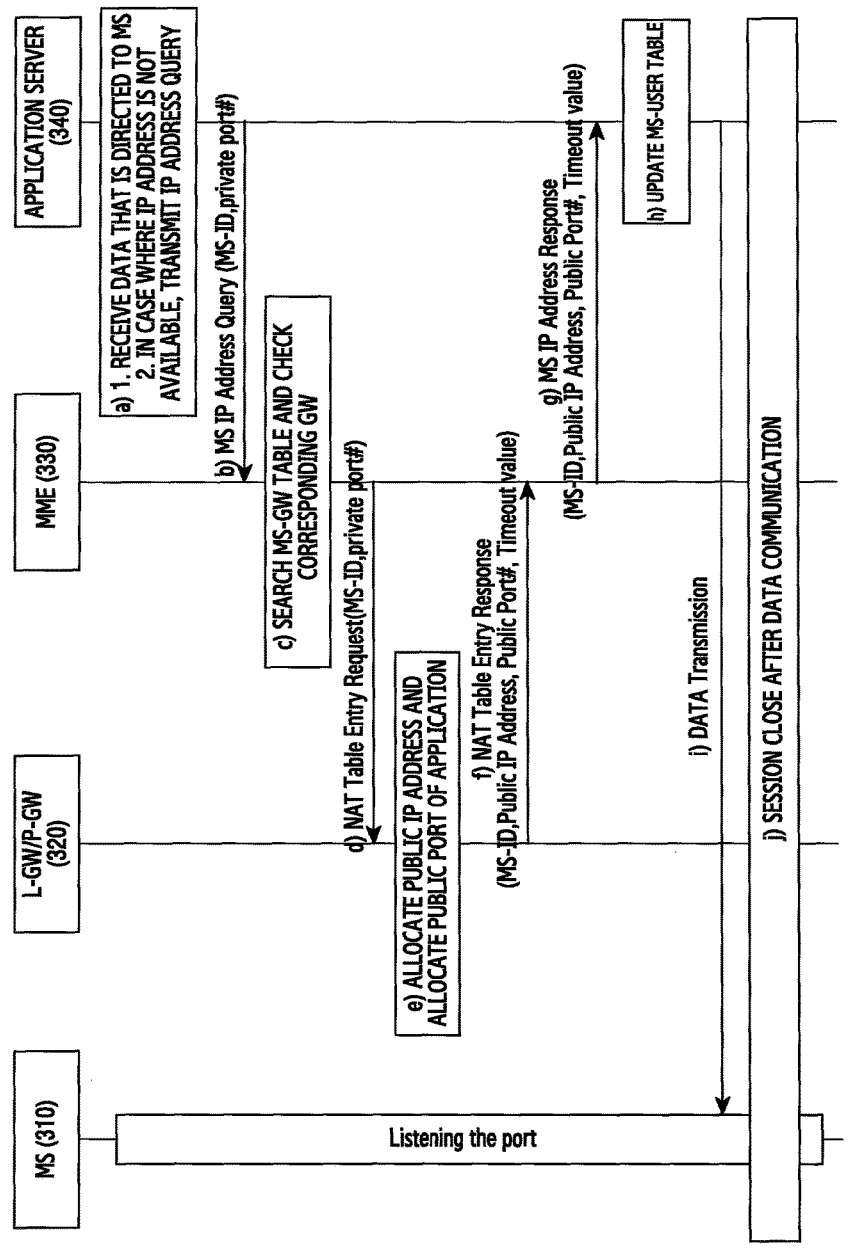
FIG. 3B is a message flow diagram illustrating an IP address query and data transmission process for a push service according to an exemplary embodiment of the present disclosure.

FIG. 3B is a message flow diagram illustrating an IP address query and data transmission process for a push service according to an exemplary embodiment of the present disclosure.

Referring to the FIG. 3B, the application server 340 receives data that is directed to the mobile station 310 (step a). Thereafter, in case where an IP address of the mobile station 310 is not available, the application server 340 queries an IP address of the mobile station 310. Here, that the IP address of the mobile station 310 is not available represents a case in which information (for example, a public IP address) about the mobile station 310 does not exist in an MS-User table that the application server 340 possesses or a case where a time out value expires.

That is, the application server 340 transmits an MS IP Address Query message requesting an IP address (public IP address) of the mobile station 310 to the MME 330 (step b). Here, it is assumed that the application server 340 is previously aware of an IP address of the MME 330. The MS IP Address Query message includes an MS-ID of the mobile station 310 and a private port number.

Thereafter, the MME 330 inspects an MS-GW table based on the MS-ID and checks the gateway 320 which the mobile station 310 is connectable with (step c). The MME 330 may inspect the MS-GW table and check the gateway 320 bound with the MS-ID.

Thereafter, the MME 330 transmits a NAT Table Entry Request message to the gateway 320 that the mobile station 310 is connectable, and requests public IP address and public port creation for the mobile station 310 to the gateway 320 (step d). The NAT Table Entry Request message includes an MS-ID of the mobile station 310, a private port number.

Thereafter, the gateway 320 receives the NAT Table Entry Request message, and acquires the MS-ID of the mobile station 310, the private port number which are included in the NAT Table Entry Request message, and allocates a public IP address, and allocates a public port for the application of the mobile station 310 (step e). That is, the gateway 320 acquires a private IP address bound to the MS-ID of the mobile station 310 in an MS Table, and allocates and binds the public IP address for the private IP address and creates a NAT Table.

Thereafter, the gateway 320 transmits a NAT Table Entry Response message to the MME 330 and provides a public IP address of the mobile station 310 to the MME 330 (step f). The NAT Table Entry Response message includes an MS-ID of the mobile station 310, the public IP address, a public port number, a time out value. The time out is a value corresponding to the aforementioned Lifetime and indicates a time in which a binding of the public IP address and the private IP address, i.e., NAT Entry is effective and, as mentioned earlier, may be defined by a service provider.

Thereafter, the MME 330 transmits an MS IP Address Response message to the application server 340 and provides a public IP address of the mobile station 310 to the application server 340 (step g). The MS IP Address Response message includes an MS-ID of the mobile station 310, the public IP address, a public port number, a time out value.

Thereafter, the application server 340 updates an MS-User Table (step h). That is, the application server 340 updates the MS-User Table using the MS-ID of the mobile station 310, the public IP address, the public port number, the time out value which are included in the MS IP Address Response message.

Thereafter, the application server 340 transmits data to the mobile station 310 using the acquired public IP address and public port of the mobile station 310 (step i). After this data transmission, a corresponding session is closed (step j)

Figure 4:
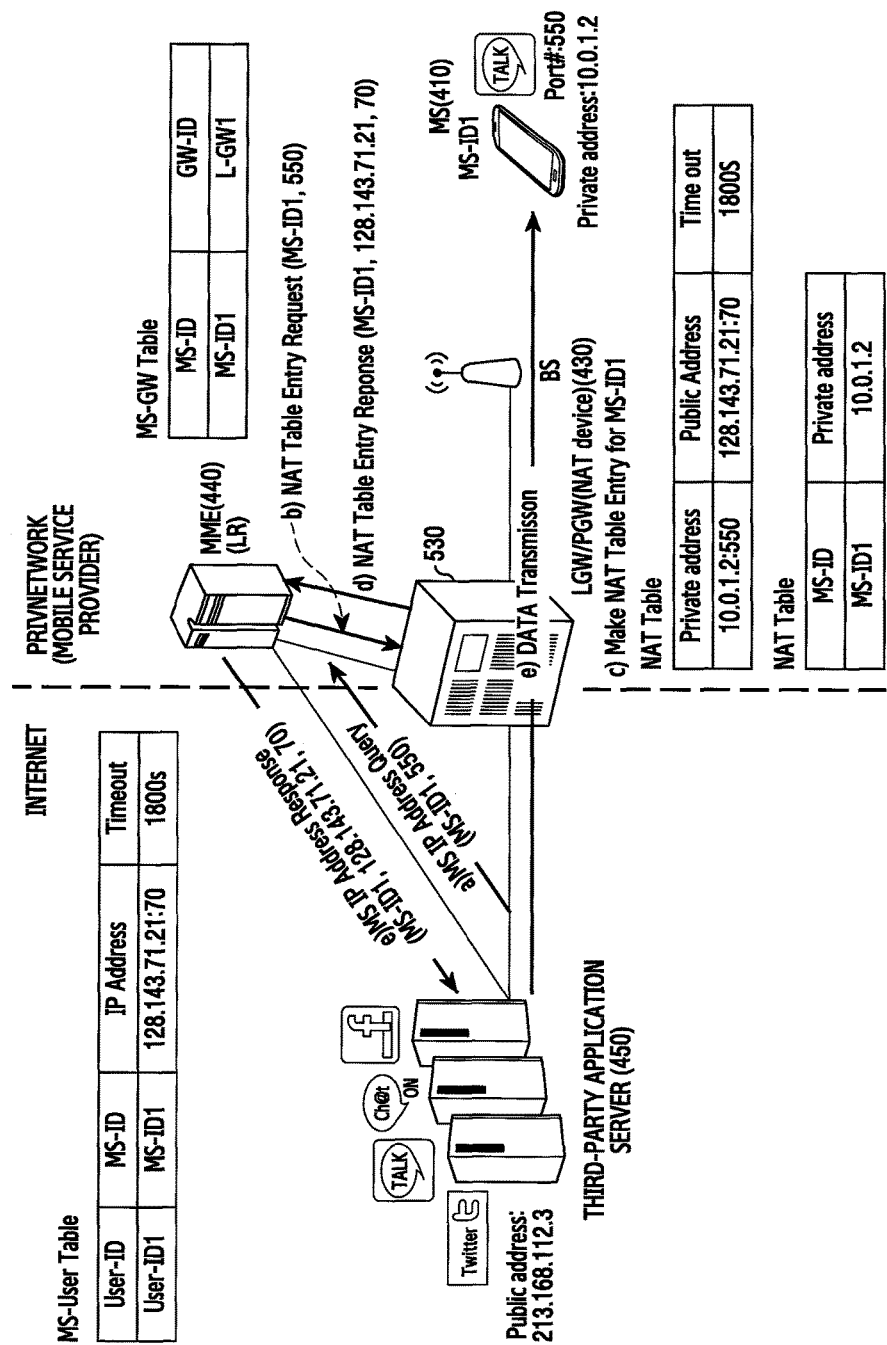
FIG. 4 is a message flow diagram for a push service according to an exemplary embodiment of the present disclosure.

FIG. 4 is a message flow diagram for a push service according to an exemplary embodiment of the present disclosure.

Referring to the FIG. 4, in case where an IP address of a mobile station 410 is not available, a third-party application server 450 queries an IP address of the mobile station 410. Here, that the IP address of the mobile station 410 is not available represents a case in which information (for example, a public IP address) about the mobile station 410 does not exist in an MS-User table that the third-party application server 450 possesses or a case where a time out value expires.

That is, the third-party application server 450 transmits an MS IP Address Query message requesting an IP address (public IP address) of the mobile station 410 to an MME 440 (step a). Here, it is assumed that the third-party application server 450 is previously aware of an IP address of the MME 440. The MS IP Address Query message includes an MS-ID of the mobile station 410 and a private port number.

Thereafter, the MME 440 inspects an MS-GW table based on the MS-ID and checks the gateway 430 which the mobile station 410 belongs to. The MME 440 may inspect the MS-GW table and check the gateway 430 bound with the MS-ID.

Thereafter, the MME 440 transmits a NAT Table Entry Request message to the gateway 430 that the mobile station 410 belongs to, and requests public IP address and public port creation for the mobile station 410 to the gateway 430 (step b). The NAT Table Entry Request message includes an MS-ID of the mobile station 410, a private port number.

Thereafter, the gateway 430 receives the NAT Table Entry Request message, and acquires the MS-ID of the mobile station 410, the private port number which are included in the NAT Table Entry Request message, and allocates a public IP address, and allocates a public port for the application of the mobile station 410 (step c). That is, the gateway 430 acquires a private IP address bound to the MS-ID of the mobile station 410 in an MS Table, and allocates and binds the public IP address for the private IP address and creates a NAT Table.

Thereafter, the gateway 430 transmits a NAT Table Entry Response message to the MME 440 and provides a public IP address of the mobile station 410 to the MME 440 (step d). The NAT Table Entry Response message includes an MS-ID of the mobile station 410, the public IP address, a public port number and may additionally include a time out value. The time out is a value corresponding to the aforementioned Lifetime value and indicates a time in which a binding of the public IP address and the private IP address, i.e., NAT Entry is effective and, as mentioned earlier, may be defined by a service provider.

Thereafter, the MME 440 transmits an MS IP Address Response message to the third-party application server 450 and provides a public IP address of the mobile station 410 to the third-party application server 450 (step e). The MS IP Address Response message includes an MS-ID of the mobile station 410, the public IP address, a public port number, and may additionally include the time out value.

Thereafter, the third-party application server 450 updates an MS-User Table. That is, the application server 450 updates the MS-User Table using the MS-ID of the mobile station 410, the public IP address, the public port number, the time out value which are included in the MS IP Address Response message.

Thereafter, the third-party application server 450 transmits data to the mobile station 410 using the acquired public IP address and public port of the mobile station 410 (step f).

Figure 5:
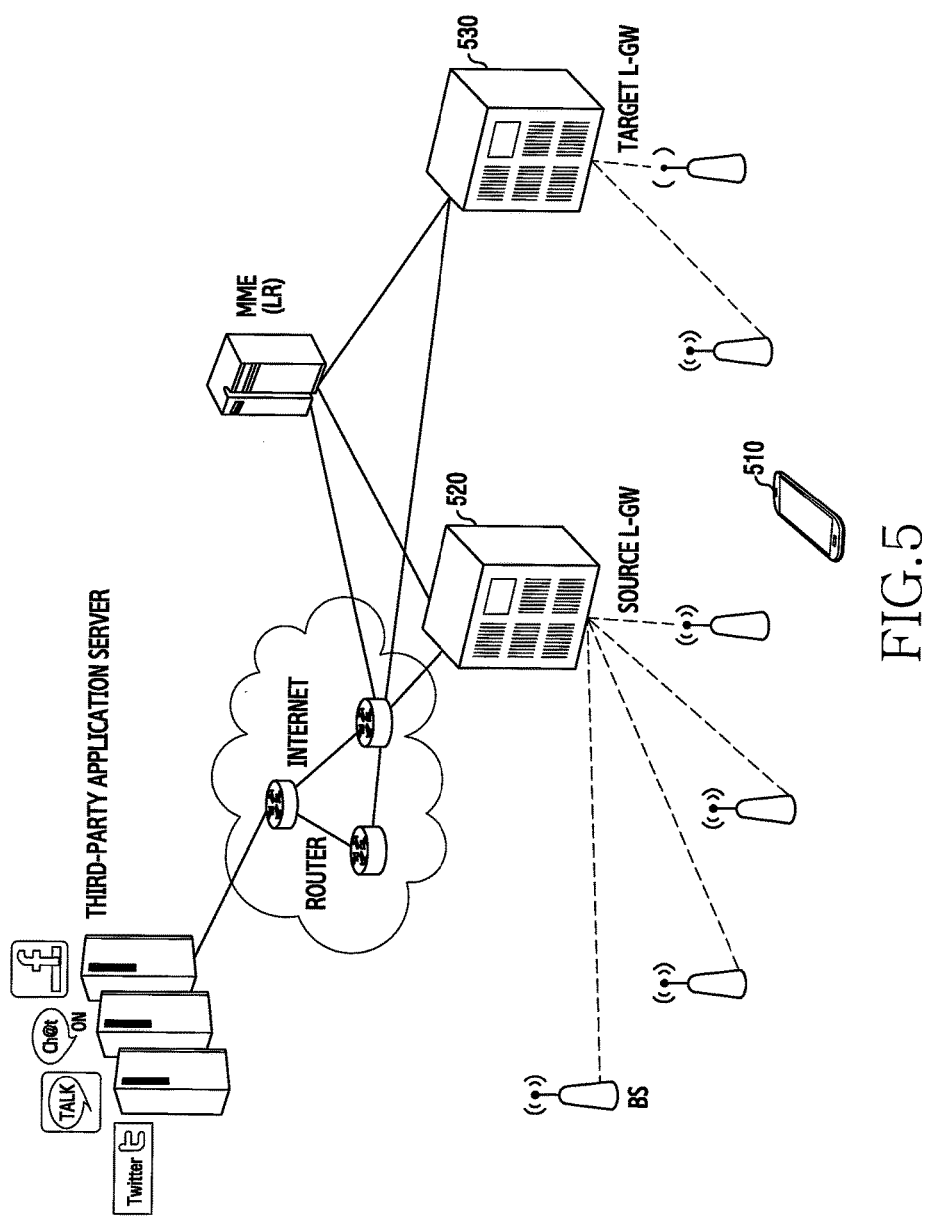
FIG. 5 is a diagram illustrating a case in which a gateway of a mobile station is changed according to an exemplary embodiment of the present disclosure.

FIG. 5 is a diagram illustrating a case in which a gateway of a mobile station is changed according to an exemplary embodiment of the present disclosure.

Referring to the FIG. 5, it illustrates a case where the mobile station 510 performs handover between gateways during communication with a third-party application server.

In case where the mobile station 510 performs handover from a source L-GW 520 to a target L-GW 530, a public IP address allocated to the mobile station is inevitably changed, because the gateway to which the mobile station 510 belongs is changed.

Accordingly to this, a procedure of notifying the changed public IP address to the third-party application server is required. A detailed procedure will be described later.

Figure 6:
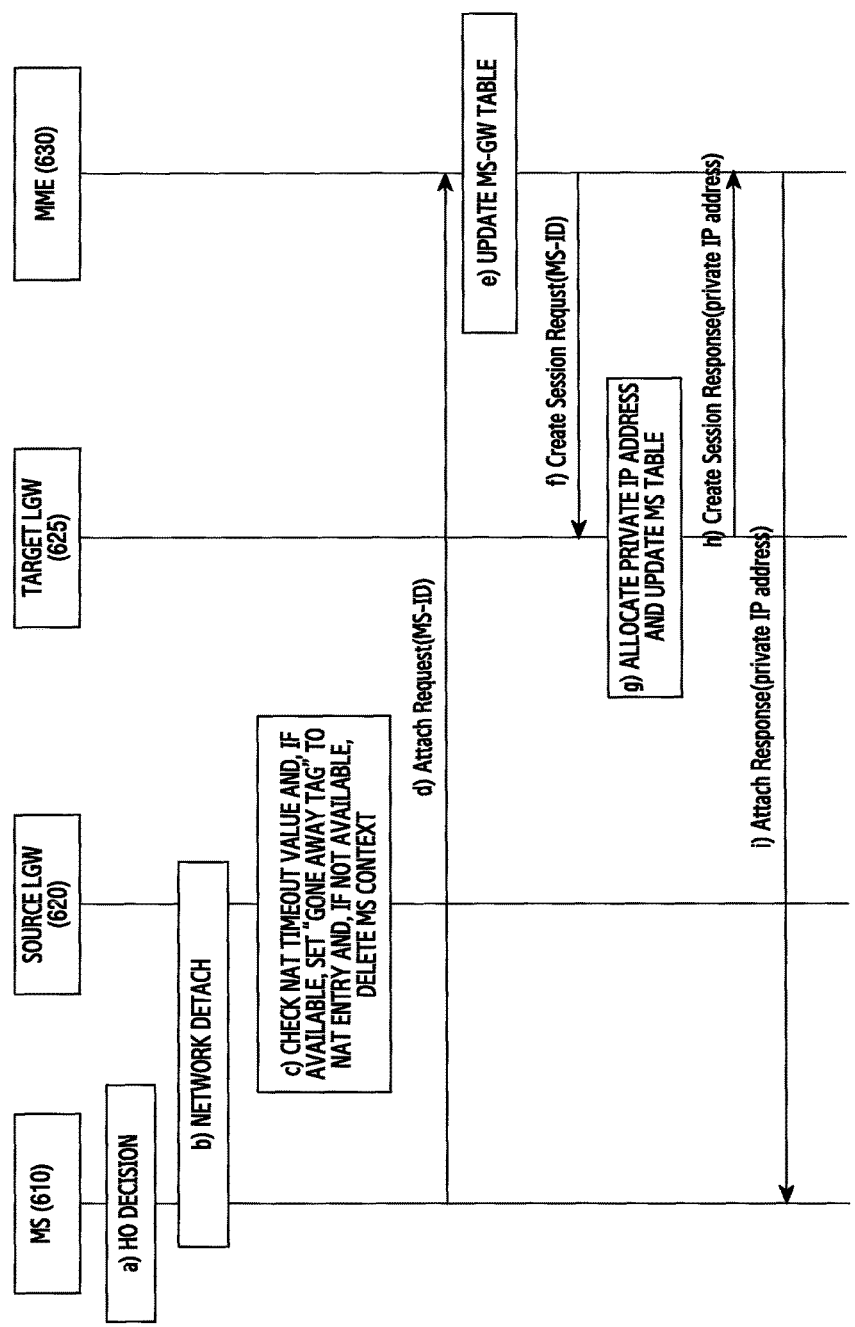
FIG. 6 is a message flow diagram illustrating a case in which a gateway of a mobile station is changed according to an exemplary embodiment of the present disclosure.

FIG. 6 is a message flow diagram illustrating a case in which a gateway of a mobile station is changed according to an exemplary embodiment of the present disclosure.

Referring to the FIG. 6, in case where the mobile station 610 decides handover (step a), the mobile station 610 performs a network detachment process with a source LGW 620 (step b).

Thereafter, the source LGW 620 inspects a NAT Table and checks a time out value corresponding to the mobile station 610 and, in case where the time out value does not expire, the source LGW 620 sets a "Gone Away TAG" to a NAT entry. If the time out value expires, the source LGW 620 deletes the NAT entry for the mobile station 610 (step c). That is, the source LGW 620 deletes an MS context. Here, the MS context indicates the NAT entry for the mobile station 610.

Thereafter, the mobile station 610 performs a network attachment process with an MME 630 (steps d~i). The network attachment process is identical with the MS attachment process of FIG. 3A.

Figure 7:
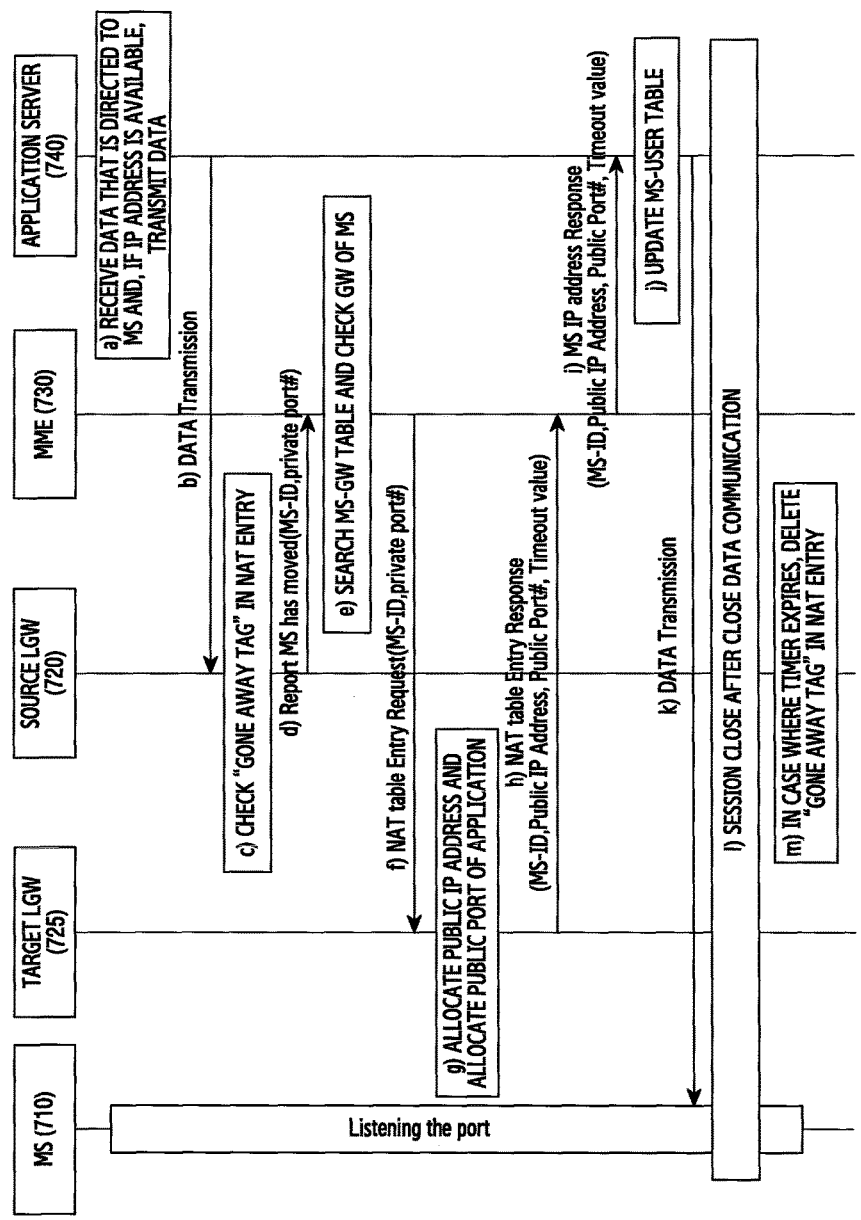
FIG. 7 is a message flow diagram of, in case where a gateway of a mobile station is changed, notifying an IP address of the changed gateway according to an exemplary embodiment of the present disclosure.

FIG. 7 is a message flow diagram of, in case where a gateway of a mobile station is changed, notifying an IP address of the changed gateway according to an exemplary embodiment of the present disclosure.

Referring to the FIG. 7, in case of receiving data that is directed to a mobile station 710, an application server 740 inspects an MS-User Table and checks if a time out value of the mobile station 710 is effective (step a). If the time out value is effective, the application server 740 transmits the data to the mobile station 710.

A public IP address of the mobile station 710 in the MS-User Table of the application server 740 is an IP address that belongs to a sub net of a source LGW 720. An IP address that the mobile station 710 is allocated by a target LGW 725 after doing handover to the target LGW 725 has not been yet updated to the MS-User Table.

Accordingly to this, the data that the application server 740 has transmitted to the mobile station 710 is transmitted to the source LGW 720 (step b).

The source LGW 720 having received the data checks whether the "Gone Away TAG" exists in a NAT entry of a NAT Table (step c) and, if the "Gone Away TAG" exists, the source LGW 720 transmits a notification message notifying that the mobile station 710 has moved to the MME 730 (step d). The notification message includes an MS-ID of the mobile station 710 and a private port number.

The MME 730 having received the notification message inspects an MS-GW table based on the MS-ID and checks the gateway (target LGW) 725 which the mobile station 710 belongs to (step e). The MME 730 may inspect the MS-GW table and check the gateway (target LGW) 725 bound with the MS-ID.

Thereafter, the MME 730 transmits a NAT Table Entry Request message to the target LGW 725 and requests public IP address and public port creation for the mobile station 710 to the target LGW 725 (step f). The NAT Table Entry Request message includes an MS-ID of the mobile station 710, a private port number.

Thereafter, the target LGW 725 receives the NAT Table Entry Request message, and acquires the MS-ID of the mobile station 710, the private port number included in the NAT Table Entry Request message, and allocates a public IP address, and allocates a public port for the application of the mobile station 710 (step g).

That is, the target LGW 725 acquires a private IP address bound to the MS-ID of the mobile station 710 in an MS Table, and allocates and binds the public IP address for the private IP address and creates a NAT Table Entry.

Thereafter, the target LGW 725 transmits a NAT Table Entry Response message to the MME 730 and provides a public IP address of the mobile station 710 to the MME 730 (step h). The NAT Table Entry Response message includes an MS-ID of the mobile station 710, the public IP address, a public port number, a time out value. The time out is a value corresponding to the aforementioned Lifetime value and indicates a time in which a binding of the public IP address and the private IP address, i.e., NAT Entry is effective and, as mentioned earlier, may be defined by a service provider.

Thereafter, the MME 730 transmits an MS IP Address Response message to the application server 740 and provides a public IP address of the mobile station 710 to the application server 740 (step i). The MS IP Address Response message includes an MS-ID of the mobile station 710, the public IP address, a public port number, a time out value.

Thereafter, the application server 740 updates an MS-User Table (step j). That is, the application server 740 updates the MS-User Table using the MS-ID of the mobile station 710, the public IP address, the public port number, the time out value which are included in the MS IP Address Response message.

Thereafter, the application server 740 transmits data to the mobile station 710 using the acquired public IP address and public port of the mobile station 710 (step k). After this data transmission, a corresponding session is closed (step l).

On the other hand, in case where a timer for the mobile station 710 expires, the source LGW 720 deletes the "Gone Away TAG" from the NAT Entry for the mobile station 710 of the NAT Table. Undoubtedly, in case where the timer expires, the source LGW 720 may delete information about the mobile station 710 from the NAT Table.

Figure 8:
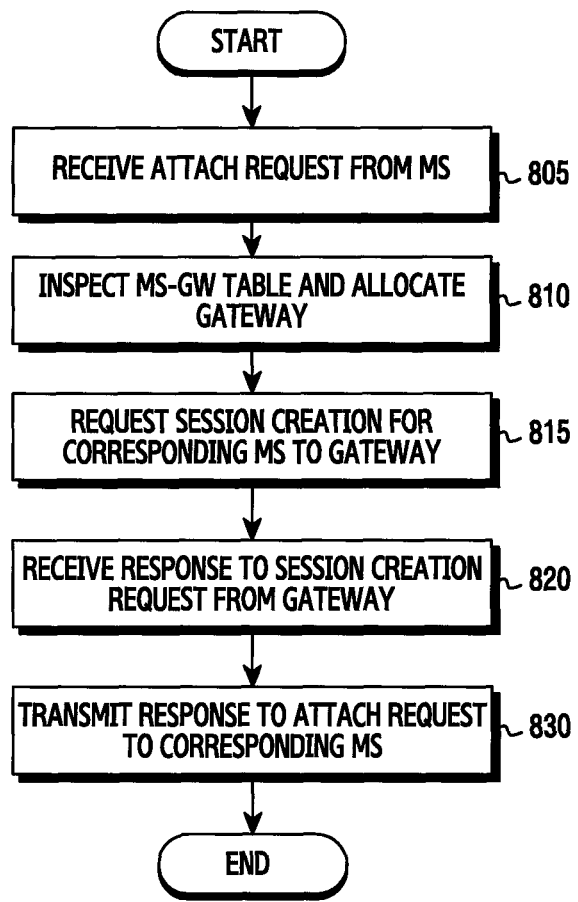
FIG. 8 is a flowchart illustrating an operation process of an MME for an attach of a mobile station according to an exemplary embodiment of the present disclosure.

FIG. 8 is a flowchart illustrating an operation process of an MME for an attachment of a mobile station according to an exemplary embodiment of the present disclosure.

Referring to the FIG. 8, the MME receives an Attach Request message from the mobile station (step 805). The Attach Request message includes an MS-ID that is an ID of the mobile station. The MS-ID indicates a unique identifier of the mobile station and, for one example, may be a phone number of the mobile station. However, the MS-ID is not limited to the phone number, and its example would not have limitations.

Thereafter, the MME inspects an MS-GW table and checks a gateway that the mobile station will belong to (step 810).

Thereafter, the MME transmits a Create Session Request message to the checked gateway and requests session creation for the mobile station to the checked gateway (step 815). The Create Session Request message includes an MS-ID of the mobile station.

Thereafter, the MME receives a Create Session Response message from the gateway and receives a response to the session creation request from the message (step 820). The Create Session Response message includes a private IP address allocated to the mobile station.

Thereafter, the MME transmits an Attach Response message to the mobile station and notifies the mobile station of a success of the attach request and a private IP address allocated to the mobile station. The Attach Response message includes the private IP address allocated to the mobile station.

Figure 9:
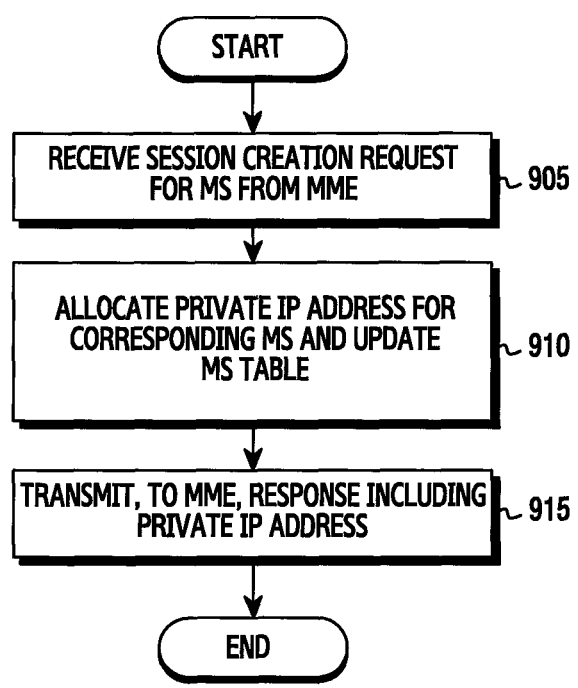
FIG. 9 is a flowchart illustrating an operation process of a gateway for an attach of a mobile station according to an exemplary embodiment of the present disclosure.

FIG. 9 is a flowchart illustrating an operation process of a gateway for an attachment of a mobile station according to an exemplary embodiment of the present disclosure.

Referring to the FIG. 9, the gateway receives a Create Session Request message from an MME and receives a request for session creation for the mobile station from the MME (step 905). The Create Session Request message includes an MS-ID of the mobile station.

Thereafter, the gateway allocates a private IP address of the mobile station, and updates an MS table (step 910). The MS table is a binding of the MS-ID of the mobile station and the private IP address allocated to the mobile station.

Thereafter, the gateway transmits a Create Session Response message to the MME and transmits a response to the session creation request to the MME (step 915). The Create Session Response message includes a private IP address allocated to the mobile station.

Figure 10:
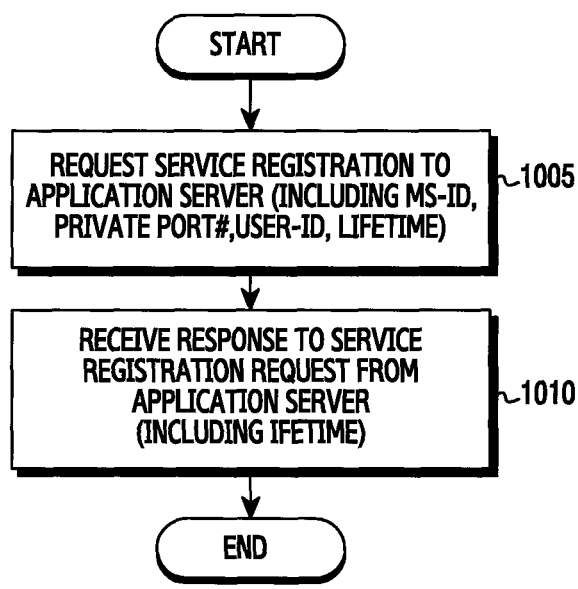
FIG. 10 is a flowchart illustrating an operation process of a mobile station for a registration of the mobile station according to an exemplary embodiment of the present disclosure.

FIG. 10 is a flowchart illustrating an operation process of a mobile station for a registration of the mobile station according to an exemplary embodiment of the present disclosure.

Referring to the FIG. 10, the mobile station transmits a Service Registration Request message to an application server and requests a registration of the mobile station and a user of the mobile station to the application server (step 1005).

The Service Registration Request message includes an MS-ID of the mobile station, a private port number, a User-ID, a lifetime. The lifetime indicates a binding effective time of the User-ID of an MS-User Table used in the application server, the MS-ID, an IP address (public IP address), and is a value capable of being set by an application provider.

Thereafter, the mobile station receives a Service Registration Response message that is a response message to the Service Registration Request message, from the application server (step 1010). The Service Registration Response message includes a lifetime.

Figure 11:
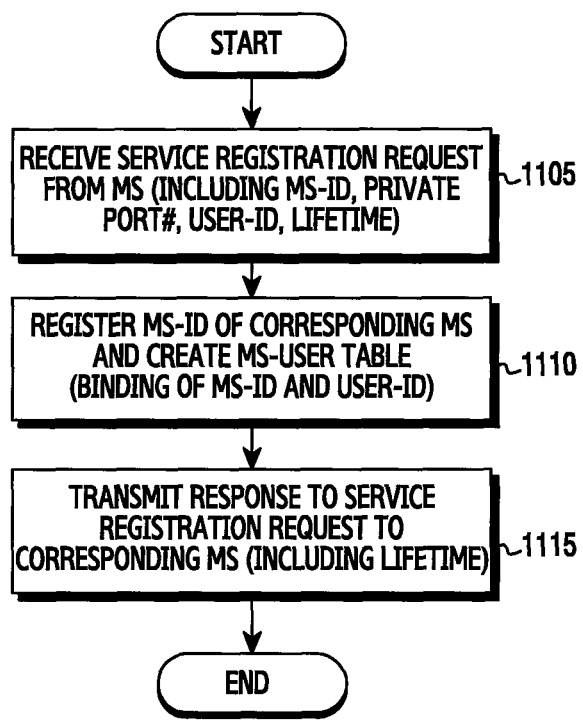
FIG. 11 is a flowchart illustrating an operation process of an application server for a registration of a mobile station according to an exemplary embodiment of the present disclosure.

FIG. 11 is a flowchart illustrating an operation process of an application server for a registration of a mobile station according to an exemplary embodiment of the present disclosure.

Referring to the FIG. 11, the application server receives a Service Registration Request message from the mobile station and receives a request for a registration of the mobile station and a user of the mobile station from the message (step 1105).

The Service Registration Request message includes an MS-ID of the mobile station, a private port number, a User-ID, a lifetime. The lifetime indicates a binding effective time of the User-ID of an MS-User Table used in the application server, the MS-ID, an IP address (public IP address), and is a value capable of being set by an application provider.

Thereafter, the application server registers the MS-ID of the mobile station. This registration process indicates a binding of the MS-ID of the mobile station, the User-ID. The binding may include a binding of the IP address (public IP address) and the lifetime which are included in the Service Registration Request message.

Thereafter, the application server transmits, to the mobile station, a Service Registration Response message that is a response message to the Service Registration Request message (step 1115). The Service Registration Response message includes a lifetime.

Figure 12:
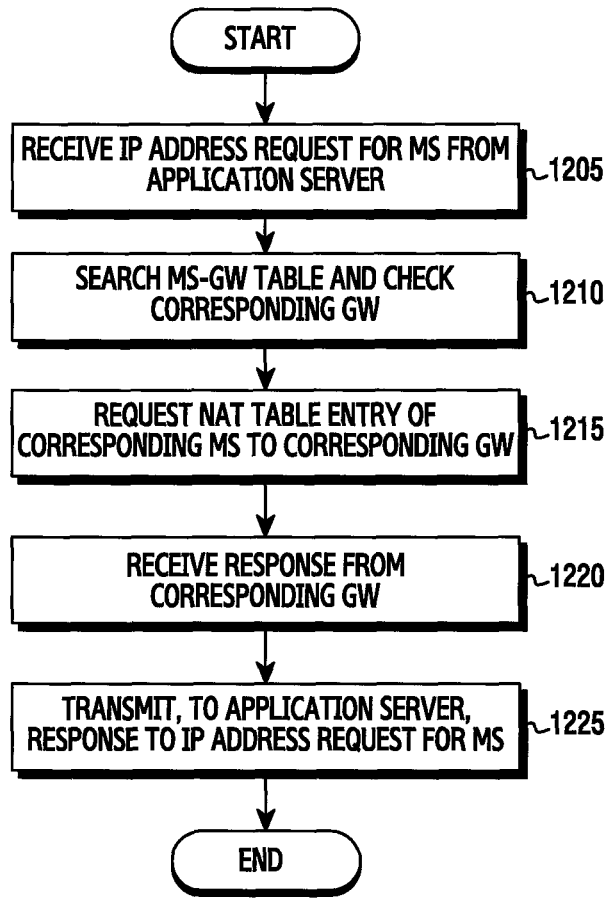
FIG. 12 is a flowchart illustrating an IP address request process of an MME for a mobile station according to an exemplary embodiment of the present disclosure.

FIG. 12 is a flowchart illustrating an IP address request process of an MME for a mobile station according to an exemplary embodiment of the present disclosure.

Referring to the FIG. 12, the MME receives an MS IP Address Query message requesting an IP address (public IP address) of the mobile station from an application server (step 1205).

Here, it is assumed that the application server is previously aware of an IP address of the MME. The MS IP Address Query message includes an MS-ID of the mobile station and a private port number.

Thereafter, the MME inspects an MS-GW table based on the MS-ID and checks a gateway which the mobile station belongs to (step 1210). The MME may inspect the MS-GW table and check the gateway bound with the MS-ID.

Thereafter, the MME transmits a NAT Table Entry Request message to the gateway that the mobile station belongs to, and requests public IP address and public port creation for the mobile station to the gateway (step 1215). The NAT Table Entry Request message includes an MS-ID of the mobile station, a private port number.

Thereafter, the MME receives a NAT Table Entry Response message from the gateway and acquires a public IP address of the mobile station from the message (step 1220).

The NAT Table Entry Response message includes an MS-ID of the mobile station, a public IP address, a public port number, a time out value. The time out is a value corresponding to the aforementioned Lifetime value and indicates a time in which a binding of the public IP address and the private IP address, i.e., NAT Entry is effective and, as mentioned earlier, may be defined by a service provider.

Thereafter, the MME transmits an MS IP Address Response message to the application server and provides a public IP address of the mobile station to the application server (step 1225). The MS IP Address Response message includes an MS-ID of the mobile station, the public IP address, a public port number, a time out value.

Figure 13:
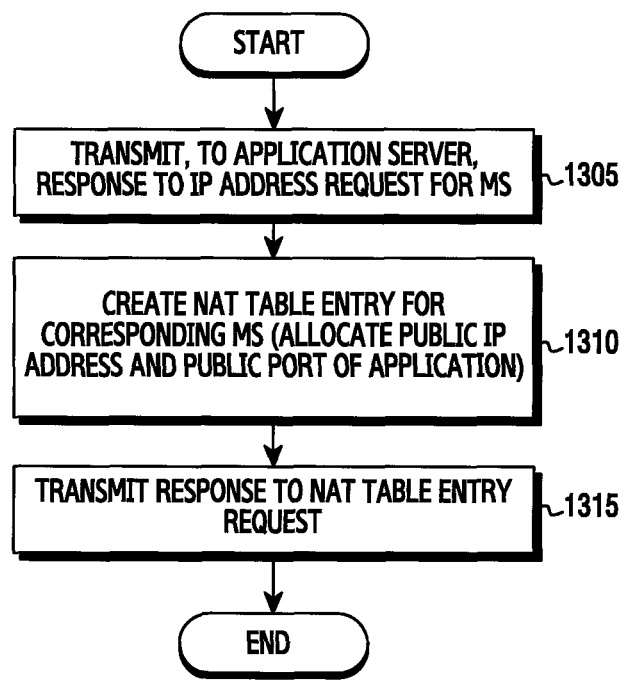
FIG. 13 is a flowchart illustrating an IP address provision process of a gateway for a mobile station according to an exemplary embodiment of the present disclosure.

FIG. 13 is a flowchart illustrating an IP address provision process of a gateway for a mobile station according to an exemplary embodiment of the present disclosure.

Referring to the FIG. 13, the gateway receives a NAT Table Entry Request message from an MME, and receives a request for public IP address and public port creation for the mobile station from the MME (step 1305). The NAT Table Entry Request message includes an MS-ID of the mobile station, a private port number.

After receiving the NAT Table Entry Request message, and the gateway acquires the MS-ID of the mobile station and the private port number which are included in the NAT Table Entry Request message, and allocates a public IP address, and allocates a public port for the application of the mobile station (step 1310).

That is, the gateway acquires the private IP address bound to the MS-ID of the mobile station in an MS Table, and allocates and binds the public IP address for the private IP address and creates a NAT Table entry.

Thereafter, the gateway transmits a NAT Table Entry Response message to the MME and provides a public IP address of the mobile station to the MME (step 1315).

The NAT Table Entry Response message includes an MS-ID of the mobile station, a public IP address, a public port number, a time out value. The time out is a value corresponding to the aforementioned Lifetime value and indicates a time in which a binding of the public IP address and the private IP address, i.e., NAT Entry is effective and, as mentioned earlier, may be defined by a service provider.

Figure 14:
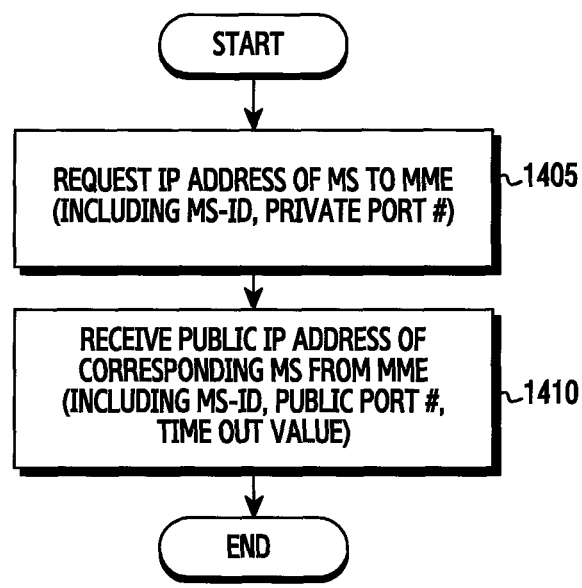
FIG. 14 is a flowchart illustrating an IP address request process of an application server for a mobile station according to an exemplary embodiment of the present disclosure.

FIG. 14 is a flowchart illustrating an IP address request process of an application server for a mobile station according to an exemplary embodiment of the present disclosure.

Referring to the FIG. 14, the application server transmits an MS IP Address Query message requesting an IP address (public IP address) of the mobile station to an MME (step 1405).

Here, it is assumed that the application server is previously aware of an IP address of the MME. The MS IP Address Query message includes an MS-ID of the mobile station and a private port number.

Thereafter, the application server receives an MS IP Address Response message from the MME, and acquires a public IP address of the MS from the message (step 1410). The MS IP Address Response message includes an MS-ID of the mobile station, a public ID address, a public port number, a time out value.

Figure 15:
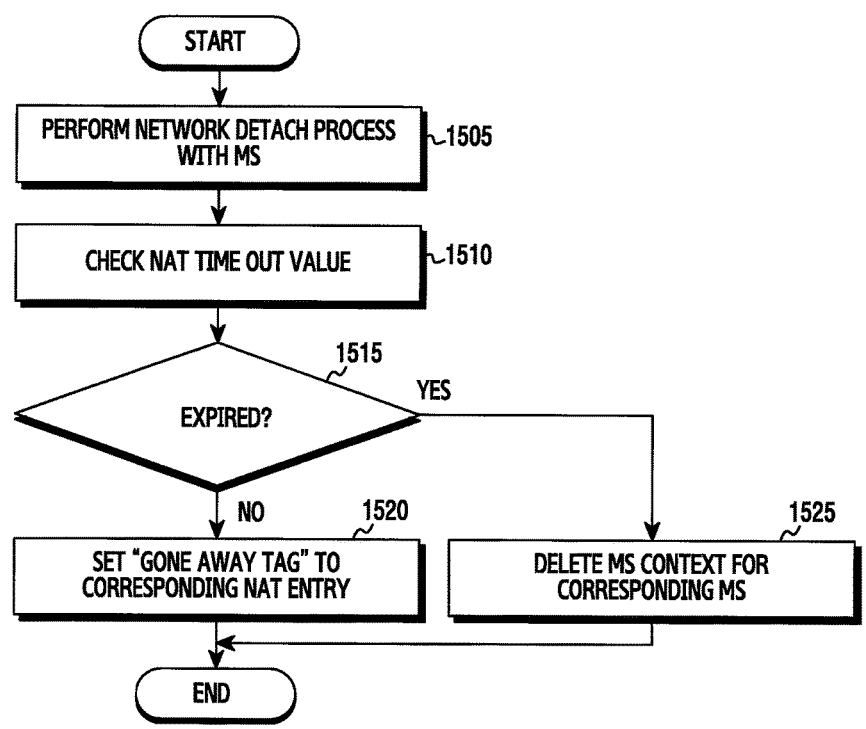
FIG. 15 is a flowchart illustrating a "Gone Away TAG" setting process in a gateway according to an exemplary embodiment of the present disclosure.

FIG. 15 is a flowchart illustrating a "Gone Away TAG" setting process in a gateway according to an exemplary embodiment of the present disclosure.

Referring to the FIG. 15, when a mobile station performs handover, the gateway performs a network detachment process with the mobile station (step 1505).

Thereafter, the gateway inspects a time out value in a NAT entry of a NAT Table for the mobile station (step 1510).

Thereafter, in case where the time out value does not expire (step 1515), the gateway sets a "Gone Away TAG" to the NAT Entry (step 1520). This indicates that the mobile station has moved, but the time out value of the mobile station has not yet expired.

In case where the time out value expires (step 1515), the gateway deletes an MS Context, which indicates NAT Entry information of the mobile station (step 1525).

Figure 16:
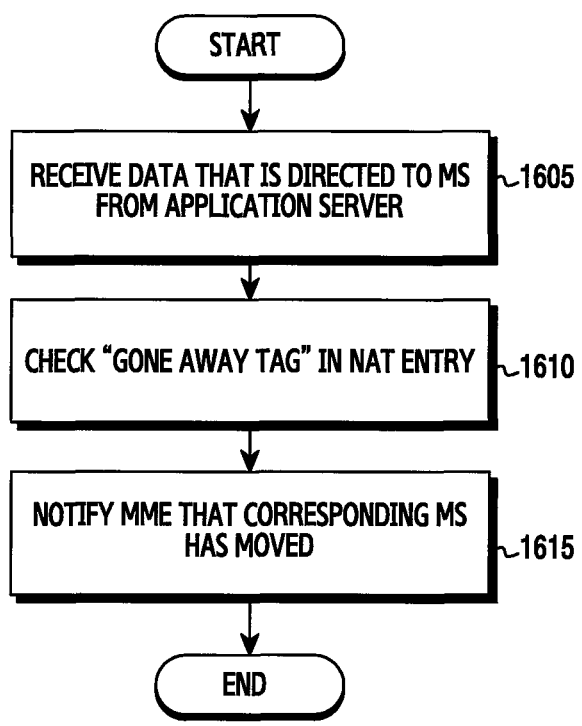
FIG. 16 is a flowchart illustrating a process of notifying a movement of a mobile station in a gateway according to an exemplary embodiment of the present disclosure.

FIG. 16 is a flowchart illustrating a process of notifying a movement of a mobile station in a gateway according to an exemplary embodiment of the present disclosure.

Referring to the FIG. 16, the gateway receives data that is directed to the mobile station from an application server (step 1605).

Thereafter, the gateway checks whether the "Gone Away TAG" exists in a NAT entry of a NAT Table for the mobile station (step 1610).

Thereafter, in case where the "Gone Away TAG" exists, the gateway transmits a notification message notifying that the mobile station has moved to the MME (step 1615). The notification message includes an MS-ID of the mobile station and a private port number.

Figure 17:
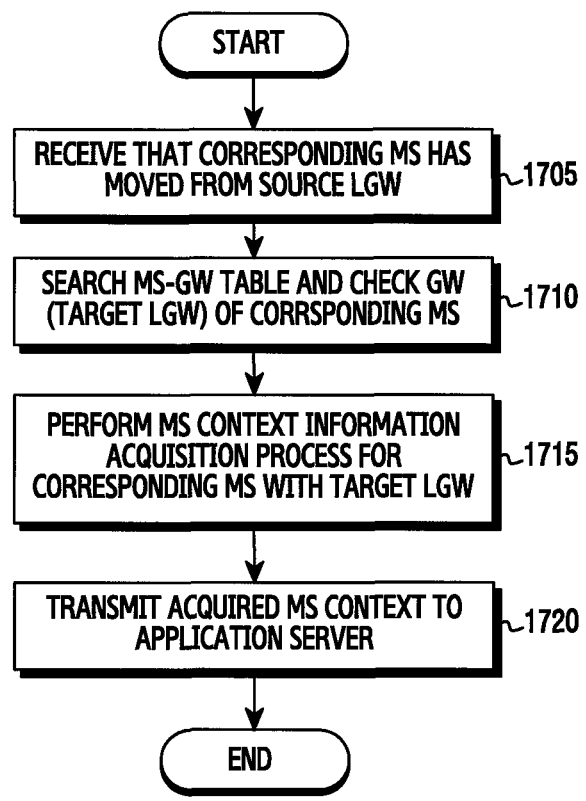
FIG. 17 is a flowchart illustrating an operation process of an MME in case where a mobile station has moved according to an exemplary embodiment of the present disclosure.

FIG. 17 is a flowchart illustrating an operation process of an MME in case where a mobile station has moved according to an exemplary embodiment of the present disclosure.

Referring to the FIG. 17, the MME receives a notification message indicating that the mobile station has moved from a source gateway (S-LGW) (step 1705). The notification message includes an MS-ID of the mobile station and a private port number.

The MME having received the notification message inspects an MS-GW table based on the MS-ID and checks a target gateway (target LGW) which the mobile station belongs to (step 1710). The MME may inspect the MS-GW table and check the gateway bound with the MS-ID.

Thereafter, the MME transmits a NAT Table Entry Request message to the target gateway and requests public IP address and public port creation for the mobile station to the target gateway. That is, the MME requests MS context information about the mobile station (step 1715). The NAT Table Entry Request message includes an MS-ID of the mobile station, a private port number.

Thereafter, the MME receives a NAT Table Entry Response message from the target gateway and acquires a public IP address of the mobile station from the message (step 1715). The NAT Table Entry Response message includes an MS-ID of the mobile station, a public IP address, a public port number, a time out value. The time out is a value corresponding to the aforementioned Lifetime value and indicates a time in which a binding of the public IP address and the private IP address, i.e., NAT Entry is effective and, as mentioned earlier, may be defined by a service provider.

Thereafter, the MME transmits an MS IP Address Response message to an application server and provides a public IP address of the mobile station to the application server (step 1720). That is, the MME provides an MS Context that is information about the mobile station. The MS IP Address Response message includes an MS-ID of the mobile station, the public IP address, a public port number, and a time out value which are the MS context.

Figure 18:
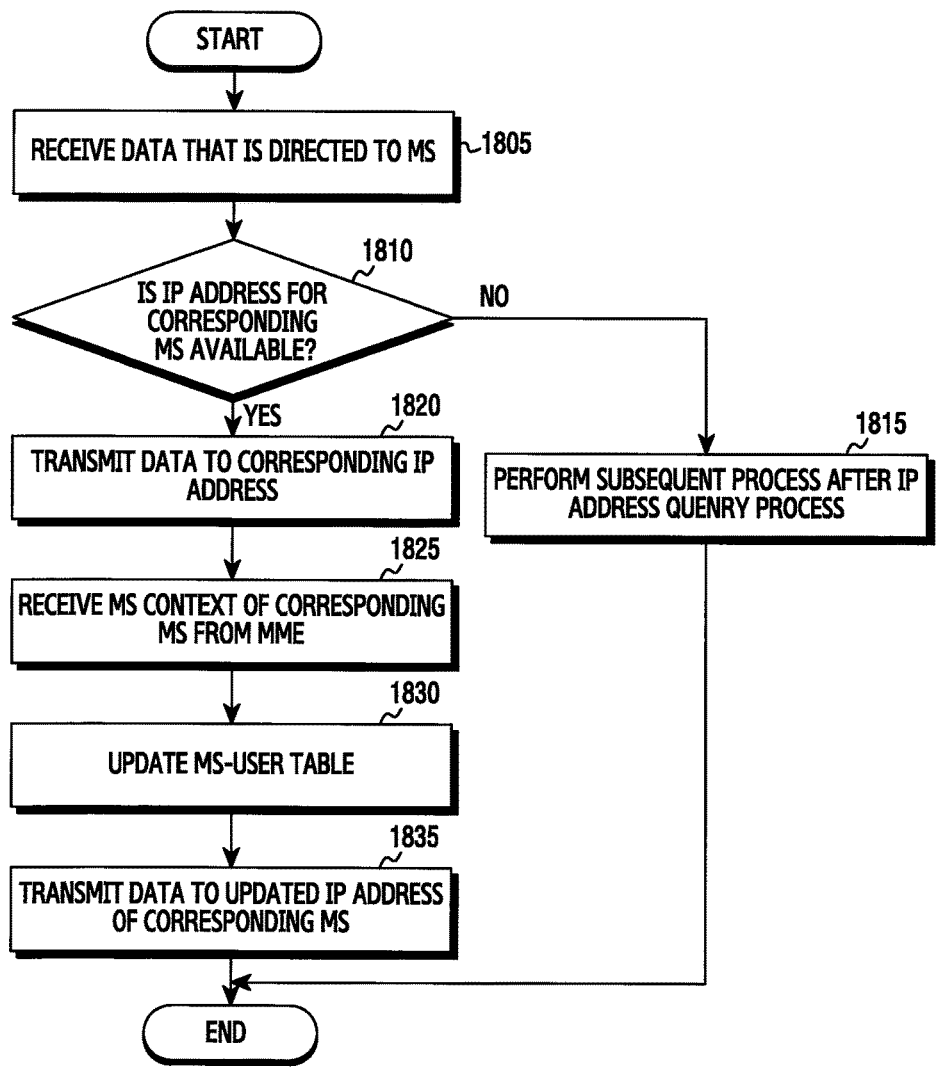
FIG. 18 is a flowchart illustrating an operation process of an application server in case where a mobile station has moved according to an exemplary embodiment of the present disclosure.

FIG. 18 is a flowchart illustrating an operation process of an application server in case where a mobile station has moved according to an exemplary embodiment of the present disclosure.

Referring to the FIG. 18, in case of receiving data that is directed to the mobile station (step 1805), the application server checks if an IP address of the mobile station is available (step 1810). For this, the application server inspects an MS-User Table and checks if a time out value of the mobile station is effective.

If the IP address is available (step 1810), that is, if the time out value is effective, the application server transmits the data to the mobile station (step 1820).

A public IP address of the mobile station in the MS-User Table of the application server is an IP address of a source gateway. An IP address of a target gateway after the mobile station does handover to the target gateway has not been yet updated in the MS-User Table. Accordingly to this, the data that the application server has transmitted to the mobile station is transmitted to the source gateway.

Thereafter, the application server receives an MS IP Address Response message from an MME and acquires a public IP address of the mobile station from the message (step 1825). That is, the application server receives an MS context that is information about the mobile station. The MS IP Address Response message includes an MS-ID of the mobile station, a public IP address, a public port number, a time out value.

Thereafter, the application server updates an MS-User Table (step 1830). That is, the application server updates the MS-User Table using the MS-ID of the mobile station, the public IP address, the public port number, the time out value which are included in the MS IP Address Response message.

Thereafter, the application server transmits data to the mobile station using the acquired public IP address and public port of the mobile station (step 1835).

If the IP address is not available (step 1810), that is, if the time out value is not effective, the application server performs a public IP address query process for the mobile station, to acquire a public IP address of the mobile station, and performs a process of transmitting data to the mobile station using the acquired public IP address (step 1815).

Figure 19:
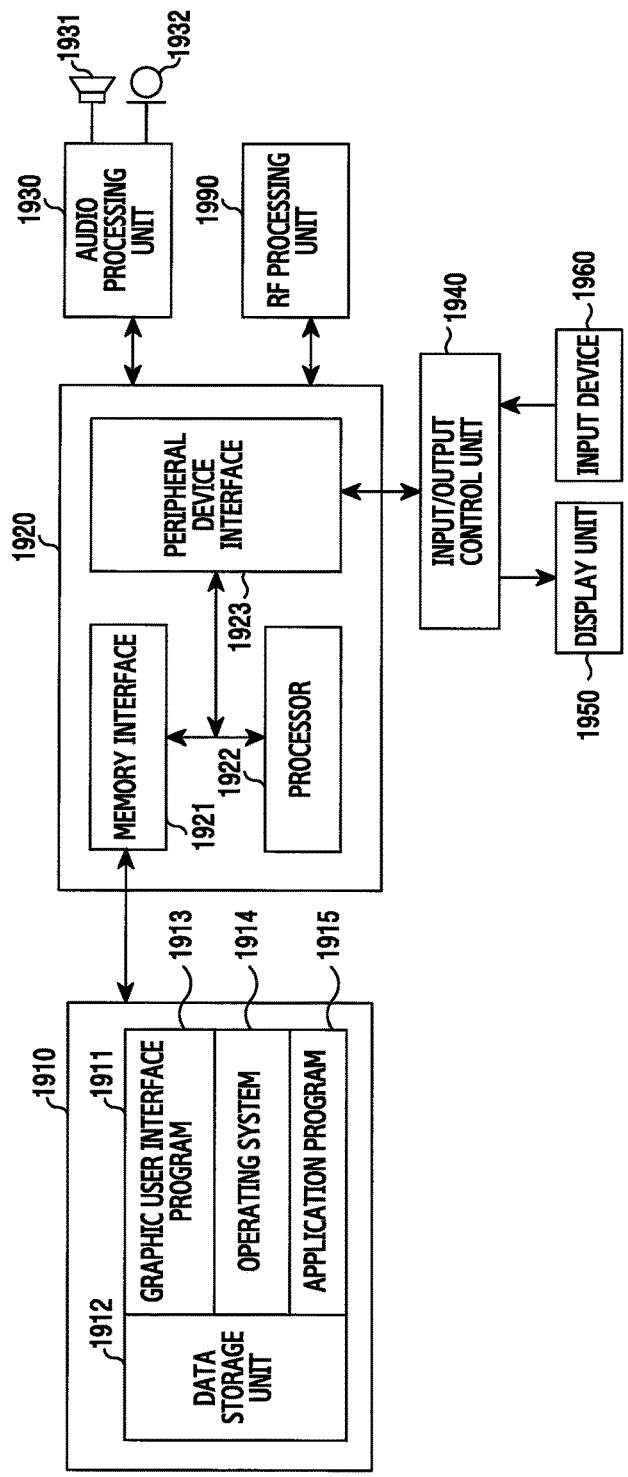
FIG. 19 illustrates a bock construction of a mobile station according to an exemplary embodiment of the present disclosure.

FIG. 19 illustrates a bock construction of a mobile station according to an exemplary embodiment of the present disclosure.

Referring to the FIG. 19, the mobile station includes a memory 1910, a processor unit 1920, an audio processing unit 1930, an input/output control unit 1940, a display unit

1950, an input device 1960, and an RF processing unit 1990. Here, the memory 1910 may exist in plurality as well. If describing about each constituent element, it is given as follows.

The memory 1910 includes a program storage unit 1911 storing a program for controlling an operation of the mobile station and a data storage unit 1912 storing data generated during program execution.

The data storage unit 1912 may store data necessary for operations of a GUI (Graphic User Interface) program 1913, an operating system 1914, and an application program 1915.

The program storage unit 1911 includes the graphic user interface program 1913, the operating system 1914, and at least one application program 1915. Here, the programs included in the program storage unit 1911 are sets of instructions, and may be expressed as instruction sets as well.

The graphic user interface program 1913 includes at least one software constituent element for graphically providing a mobile station interface on the display unit 1950. That is, the graphic user interface program 1913 includes an instruction of displaying, on the display unit 1950, application program information driven by the processor 1922.

The operating system 1914 provides an environment for driving an application program.

The application program 1915 includes a software constituent element of at least one application program installed in the mobile station. The application program 1915 may perform an operation of the mobile station of FIG. 10.

The processor unit 1920 includes a memory interface 1921, at least one processor 1922, and a peripheral device interface 1923. Here, the memory interface 1921, the at least one processor 1922, and the peripheral interface 1923, which are included in the processor unit 1920, may be integrated as at least one integrated circuit or be implemented as separate constituent elements.

The memory interface 1921 controls memory 1910 access of a constituent element such as the processor 1922 or the peripheral device interface 1923.

The peripheral device interface 1923 controls connection of an input/output peripheral device of the mobile station and the processor 1922 and the memory interface 1921.

The processor 1922 controls the mobile station to provide various services using at least one software program. At this time, the processor 1922 executes at least one program stored in the memory 1910 and provides a service corresponding to the corresponding program.

The audio processing unit 1930 provides an audio interface through a speaker 1931 and a microphone 1932.

The input/output control unit 1940 provides an interface between an input/output device such as the display unit 1950 and the input device 1960, etc. and the peripheral device interface 1923.

The display unit 1950 displays state information of the mobile station, a text inputted by the mobile station, a moving picture, a still picture, etc. For example, the display unit 1950 displays application program information driven by the processor 1922.

The input device 1960 provides input data generated by a selection of the mobile station to the processor unit 1920 through the input/output control unit 1940. At this time, the input device 1960 includes a keypad including at least one hardware button and a touch pad detecting touch information, etc. For example, the input device 1960 provides touch information of a touch, a touch motion, a touch release, etc. which are detected through the touch pad, to the processor 1922 through the input/output control unit 1940.

Additionally, the mobile station includes the RF processing unit 1990 performing a communication function for voice communication and data communication. At this time, the RF processing unit 1990 may be distinguished into a plurality of communication sub modules supporting communication networks different from one another. For example, the communication network includes, though not limited to, a GSM (Global System for Mobile Communication) network, an EDGE (Enhanced Data GSM Environment) network, a CDMA (Code Division Multiple Access) network, a W-CDMA (W-Code Division Multiple Access) network, an LTE (Long Term Evolution) network, an OFDMA (Orthogonal Frequency Division Multiple Access) network, a wireless LAN, a Bluetooth network, and an NFC (Near Field Communication), etc.

Figure 20:
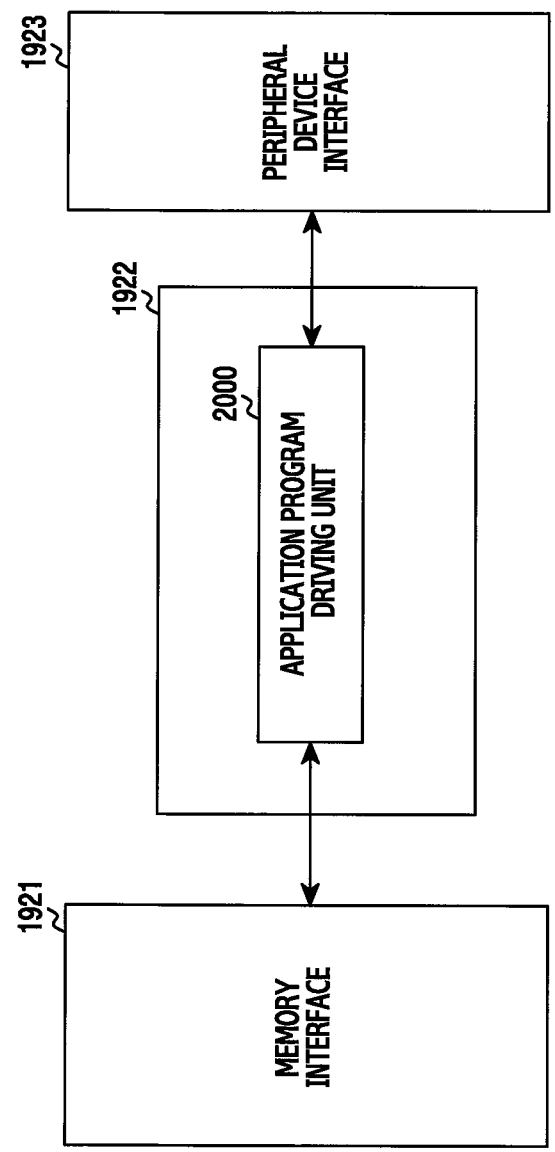
FIG. 20 is a diagram illustrating a detailed block construction of a mobile station processor according to an exemplary embodiment of the present disclosure.

FIG. 20 is a diagram illustrating a detailed block construction of a mobile station processor according to an exemplary embodiment of the present disclosure.

Referring to the FIG. 20, the processor 1922 includes an application program driving unit 2000.

The application program driving unit 2000 executes at least one application program 1915 stored in the program storage unit 1911 through the memory interface 1921 and provides a service on an operating system according to the corresponding application program.

For example, in case where executing a messenger program, the application program driving unit 2000 executes the corresponding messenger application program, and provides a service on the operating system according to the messenger application program.

Particularly, the application program driving unit 2000 provides, to the application program 1915, a communication function with another node through the peripheral device interface 1923 and the RF processing unit 1990.

Figure 21:
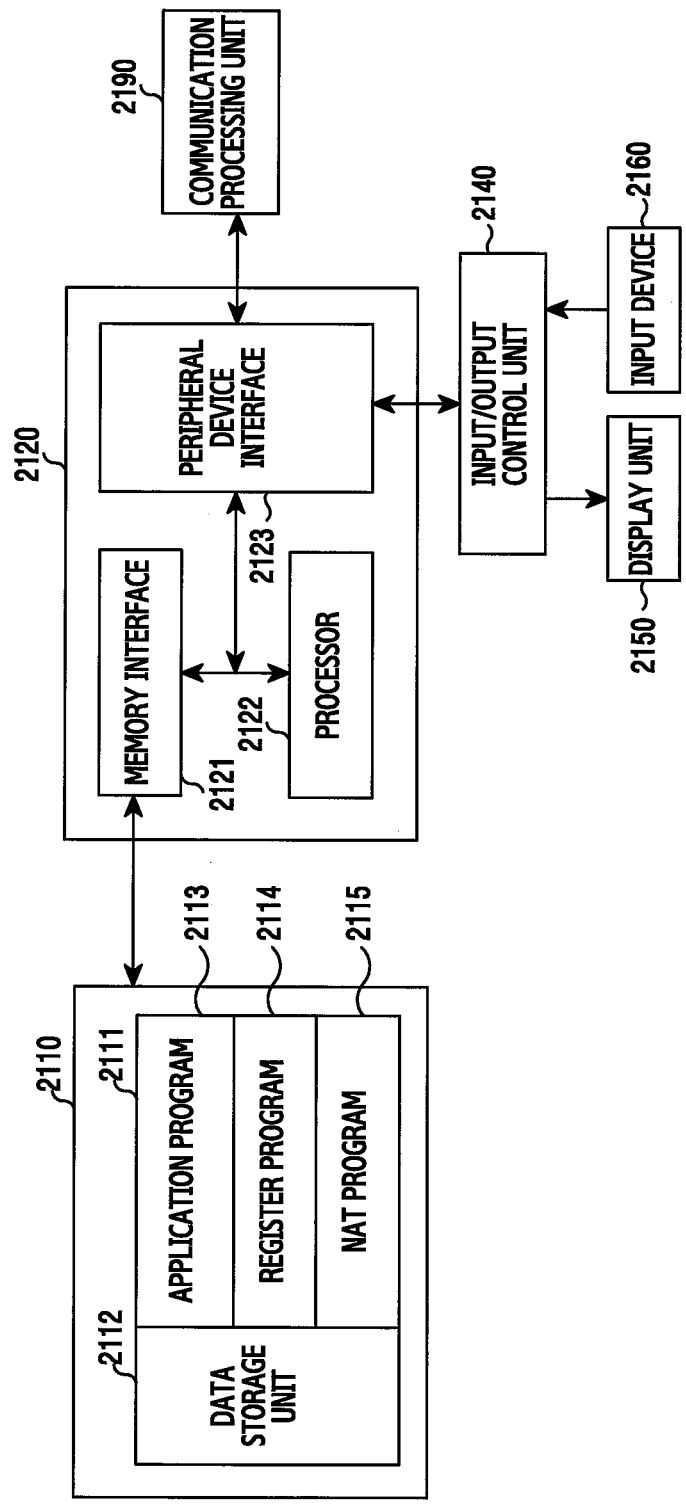
FIG. 21 is a diagram illustrating a block construction of an MME, gateway and application server according to an exemplary embodiment of the present disclosure.

FIG. 21 is a diagram illustrating a block construction of an MME, gateway and application server according to an exemplary embodiment of the present disclosure.

Referring to the FIG. 21, the MME, gateway and application server include a memory 2110, a processor unit 2120, an input/output control unit 2140, a display unit 2150, and an input device 2160. Here, the memory 2110 may exist in plural as well. If describing about each constituent element, it is given as follows.

The memory 2110 includes a program storage unit 2111 storing programs for controlling operations of a location register and a gateway and a data storage unit 2112 storing data generated during program execution.

The data storage unit 2112 may store data necessary for operations of an application program 2113, a register program 2114 and a NAT program 2115.

The program storage unit 2111 includes the application program 2113, the register program 2114 and the NAT program 2115. Here, the programs included in the program storage unit 2111 are sets of instructions and may be expressed as instruction sets as well. Here, the MME and the application server may not have the NAT program 2115.

The application program 2113 includes an application program that is operated in the MME, gateway and application server. That is, the application program 2113 includes an instruction of an application driven by a processor 2122.

In the MME, the register program 2114 may perform functions of FIGS. 8, 12, 17.

In the gateway, the NAT program 2115 may perform functions of FIGS. 9, 13, 15, 16.

In the application server, the register program 2114 may perform functions of FIG. 11, FIG. 14, and FIG. 18.

The memory interface 2121 controls memory 2110 access of a constituent element such as the processor 2122 or a peripheral device interface 2123.

The peripheral device interface 2123 controls connection of an input/output peripheral device of the MME, gateway and application server and the processor 2122 and the memory interface 2121.

The processor 2122 uses at least one software program, to control the MME, gateway and application server to provide a corresponding service. At this time, the processor 2122 executes at least one program stored in the memory 2110 and provides a service corresponding to the corresponding program.

The input/output control unit 2140 provides an interface between an input/output device such as the display unit 2150 and the input device 2160, etc., and the peripheral device interface 2123.

The display unit 2150 displays state information, a text inputted, a moving picture, and a still picture, etc. For example, the display unit 2150 displays application program information driven by the processor 2122.

The input device 2160 provides input data generated by a selection of the MME, gateway and application server to the processor unit 2120 through the input/output control unit 2140. At this time, the input device 2160 includes a keypad including at least one hardware button and a touch pad detecting touch information, etc. For example, the input device 2160 provides touch information of a touch, a touch motion, a touch release, etc. which are detected through the touch pad, to the processor 2122 through the input/output control unit 2140.

Additionally, the MME, gateway, and application server include a communication processing unit 2190 performing a communication function for voice communication and data communication.

Figure 22:
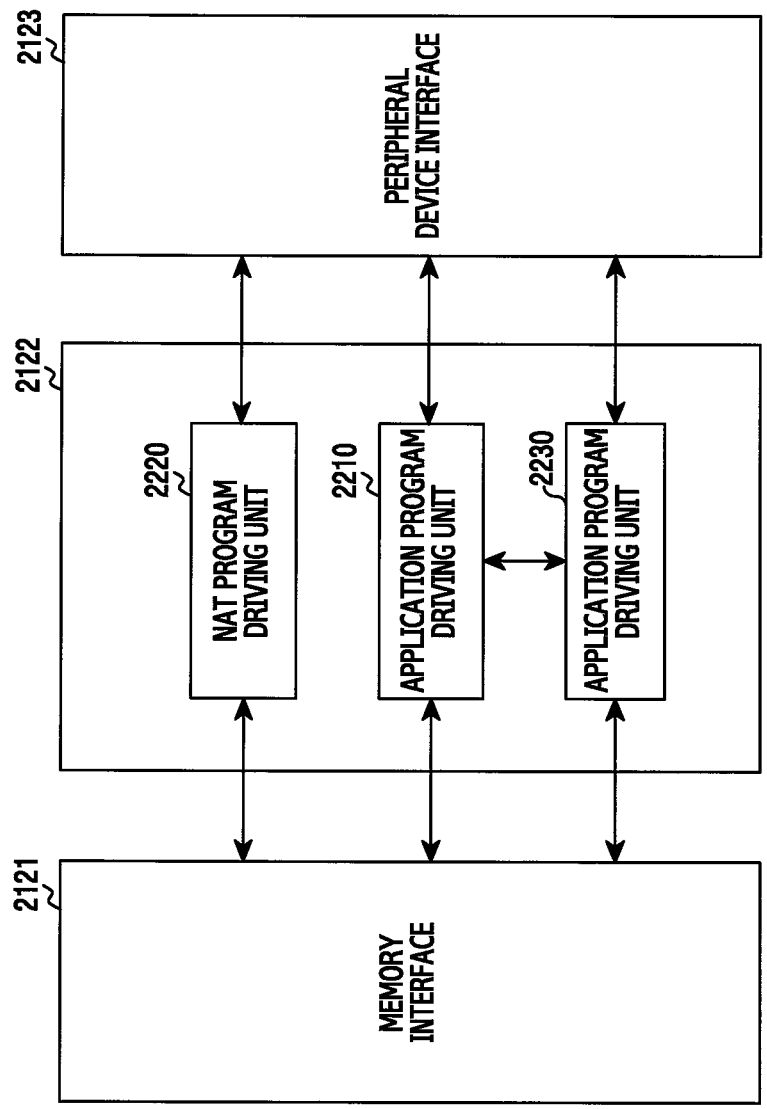
FIG. 22 is a diagram illustrating a detailed block construction of an MME, gateway and application server according to an exemplary embodiment of the present disclosure.

FIG. 22 is a diagram illustrating a detailed block construction of an MME, gateway and application server according to an exemplary embodiment of the present disclosure.

Referring to the FIG. 22, the processor 2122 of the present disclosure includes an application program driving unit 2210, a NAT program driving unit 2220, and a register program driving unit 2230.

The application program driving unit 2210 executes at least one application program 2113 stored in the program storage unit 2111 through the memory interface 2121 and provides a service on an operating system according to the corresponding application program.

The NAT program driving unit 2220 executes the NAT program 2115 of the program storage unit 2111 through the memory interface 2121 and provides a service on the operating system according to the corresponding program.

Particularly, the NAT program driving unit 2220 provides, to the NAT program 2115, a communication function with another node through the peripheral device interface 2123 and the communication processing unit 2190.

The register program driving unit 2230 executes the register program 2114 of the program storage unit 2111 through the memory interface 2121 and provides a service on the operating system according to the corresponding program.

Particularly, the register program driving unit 2230 provides, to the register program 2114, a communication function with another node through the peripheral device interface 2123 and the communication processing unit 2190.

A method for providing a push service in a communication system, the method may include the processes of, in an application server, in case where incoming data for a mobile station exists, transmitting, to a location register, a first message for a query of an IP address of the mobile station, in case where the location register receives the first message, transmitting, to a gateway, a second message requesting a NAT (Network Address Translation) table entry of the mobile station, transmitting, to the location register by the gateway, a third message for the NAT table entry of the mobile station, transmitting, to the application server by the location register, a fourth message for the query of the IP address of the mobile station, and transmitting, by the application server, the incoming data to the mobile station, based on information included in the fourth message.

The process of transmitting, by the application server, the first message to the location register may include the process of determining, by the application server, the location register using a mobile station ID, and the first message includes at least one of the mobile station ID of the mobile station and a private port number.

The second message includes at least one of a mobile station ID of the mobile station, and a private port number, and the process of transmitting, to the gateway by the location register, the second message requesting location information of the mobile station may include the processes of determining a gateway connected with the mobile station using the mobile station ID, and requesting a NAT table entry of the mobile station to the determined gateway.

The process of transmitting, by the gateway, the third message to the location register may include the processes of using the mobile station ID of the mobile station included in the second message to determine, by the gateway, a public IP address of the mobile station and a public port corresponding to the mobile station ID, and transmitting, to the location register by the gateway, the third message including a public IP address, a mobile station ID, a public port number, a time out value.

The process of transmitting, by the application server, the incoming data to the mobile station may include the process of using the public IP address of the mobile station to transmit, by the application server, the data to the mobile station.

The method may further include the process of performing, by the gateway, a detachment process with the mobile station and, in case where a first tag setting condition is satisfied, setting the first tag to information about the mobile station.

The method may further include the processes of receiving, by the gateway, data that is directed to the mobile station and, in case where the first tag is set in the information about the mobile station, transmitting, to the location register, a notification message indicating that the mobile station has moved.

The method may further include the processes of, in case where the location register receives a notification message indicating that the mobile station has moved, using the mobile ID of the mobile station included in the notification message to determine a target gateway to be connected with the mobile station, transmitting, to the target gateway, the second message requesting a NAT table entry of the mobile station, receiving, from the target gateway, the third message for the NAT table entry of the mobile station, and transmitting, to the application server, the fourth message for the query of the IP address of the mobile station.

In a method for operating a location register in a communication system, the method may include the processes of receiving, from an application server, a first message requesting location information of a mobile station, transmitting, to a gateway, a second message requesting the location information of the mobile station, receiving, from the gateway, a third message including the location information of the mobile station, and transmitting, to the application server, a fourth message including the location information of the mobile station.

In various exemplary embodiments, the process of transmitting, to the gateway, the second message requesting the location information of the mobile station includes the processes of using a mobile station ID of the mobile station included in the first message, to determine the gateway possessing the location information of the mobile station, and transmitting the second message requesting the location information of the mobile station to the determined gateway, and the first message and second message may be at least one of the mobile station ID, a private port number.

In various exemplary embodiments, the third, fourth message, and location information may include at least one of a mobile station ID of the mobile station, a public IP address, a public port number, a time out value.

In various exemplary embodiments, the method may further include the processes of in case of receiving a notification message indicating that the mobile station has moved, using a mobile station ID of the mobile station included in the notification message, to determine another gateway possessing the location information of the mobile station, transmitting, to the another gateway, the second message requesting the location information of the mobile station, receiving, from the another gateway, the third message including the location information of the mobile station, and transmitting, to the application server, the fourth message including the location information of the mobile station.

An apparatus of a location register in a communication system includes at least one processor, a memory, a communication processing unit communicating with another node, and at least one program stored in the memory and driven by the one or more processors, and the program may receive, from an application server, a first message requesting location information of a mobile station through the communication processing unit, transmit, to a gateway, a second message requesting the location information of the mobile station, receive, from the gateway, a third message including the location information of the mobile station, and transmit, to the application server, a fourth message including the location information of the mobile station.

In various exemplary embodiments, when transmitting, to the gateway, the second message requesting the location information of the mobile station, the program uses a mobile station ID of the mobile station included in the first message, to determine the gateway possessing the location information of the mobile station, and transmits the second message requesting the location information of the mobile station to the determined gateway, and the first message and second message may be at least one of the mobile station ID, a private port number.

In various exemplary embodiments, the third, fourth message, and location information may include at least one of a mobile station ID of the mobile station, a public IP address, a public port number, a time out value.

In various exemplary embodiments, in case of receiving a notification message indicating that the mobile station has moved, the program may use the mobile station ID of the mobile station included in the notification message, to determine another gateway possessing the location information of the mobile station, transmit, to the another gateway, the second message requesting the location information of the mobile station, receive, from the another gateway, the third message including the location information of the mobile station, and transmit, to the application server, the fourth message including the location information of the mobile station.

In various exemplary embodiments, a method for operating a gateway in a communication system may include the processes of receiving a first message requesting location information of a mobile station from a location register, determining location information of the mobile station, and transmitting, to the location register, a second message including the location information of the mobile station.

In various exemplary embodiments, the first message includes at least one of a mobile station ID of the mobile station, a private port, and the process of determining the location information of the mobile station may include the process of using the mobile station ID of the mobile station included in the first message, to determine a public IP address of the mobile station corresponding to the mobile station ID.

In various exemplary embodiments, the process of transmitting the second message including the location information of the mobile station to the location register may include the process of transmitting, to the location register, the second message including at least one of the public IP address, the mobile station ID, a public port number of the mobile station, and a time out value.

In various exemplary embodiments, the method may further include the processes of performing a detachment process with the mobile station, and in case where a first tag setting condition is satisfied, setting a first tag to information about the mobile station.

In various exemplary embodiments, the method may further include the processes of receiving data that is directed to the mobile station, and in case where a first tag is set in information about the mobile station, transmitting, to the location register, a notification message indicating that the mobile station has moved.

An apparatus of a gateway in a communication system includes at least one processor, a memory, a communication processing unit communicating with another node, and at least one program stored in the memory and driven by the one or more processors, and the program may receive a first message requesting location information of a mobile station from a location register through the communication processing unit, and determine the location information of the mobile station, and transmit, to the location register, a second message including the location information of the mobile station.

In various exemplary embodiments, when determining location information of the mobile station, uses the mobile station ID of the mobile station included in the first message, to determine a public IP address of the mobile station corresponding to the mobile station ID, and the first message includes at least one of the mobile station ID of the mobile station, a private port.

In various exemplary embodiments, when transmitting, to the location register, the second message including information of the mobile station, the program may transmit, to the location register, a second message including at least one of a public IP address, a mobile station ID, a public port number of the mobile station, and a time out value.

In various exemplary embodiments, the program may perform a detachment process with the mobile station, and in case where a first tag setting condition is satisfied, set a first tag to information about the mobile station.

In various exemplary embodiments, when receiving data that is directed to the mobile station, in case where a first tag is set in information about the mobile station, the program may transmit, to the location register, a notification message indicating that the mobile station has moved.

While the subject matter of the present disclosure has been shown and described with reference to certain preferred embodiments thereof, it will be understood by those skilled in the art that various changes in form and details may be made therein without departing from the spirit and scope of the disclosure as defined by the appended claims.

What is claimed is:

1. A method for operating a location register in a communication system, the method comprising:
    receiving, from an application server, a first message for a query of a public internet protocol (IP) address of a mobile station;
    transmitting, to a gateway, a second message requesting a network address translation (NAT) table entry of the mobile station;
    receiving, from the gateway, a third message for the NAT table entry of the mobile station, wherein the third message comprises the public IP address and a time out value indicating a time in which a binding of the public IP address and a private IP address of the mobile station is effective; and
    transmitting, to the application server, a fourth message comprising the public IP address and the time out value.

2. The method of claim 1, wherein transmitting, to the gateway, the second message requesting the NAT table entry of the mobile station comprising:
    determining the gateway connected with the mobile station by using a mobile station identifier (ID) of the mobile station comprised in the first message; and
    transmitting, to the gateway, the second message requesting the NAT table entry of the mobile station,
    wherein the first message and second message comprise at least one of the mobile station ID, a private port number of the mobile station.

3. The method of claim 1, wherein the third message and the fourth message further comprise at least one of a mobile station ID of the mobile station, a public port number of the mobile station.

4. The method of claim 1, further comprising:
    in case of receiving a notification message indicating that the mobile station has moved, determining a target gateway to be connected with the mobile station by using a mobile station ID of the mobile station comprised in the notification message;
    transmitting, to the target gateway, the second message requesting the NAT table entry of the mobile station;
    receiving, from the target gateway, the third message for the NAT table entry of the mobile station; and
    transmitting, to the application server, the fourth message about the query of the public IP address of the mobile station.

5. The method of claim 1, wherein the public IP address of the mobile station is configured to enable transmission of data from the application server to the mobile station.

6. An apparatus of a location register in a communication system, the apparatus comprising:
    a memory;
    a communication processing unit communicating with another node; and
    at least one processor operatively coupled to the communication processing unit,
    wherein the at least one processor is configured to:
        receive, from an application server, a first message for a query of a public internet protocol (IP) address of a mobile station through the communication processing unit;
        transmit, to a gateway, a second message requesting a network address translation (NAT) table entry of the mobile station;
        receive, from the gateway, a third message for the NAT table entry of the mobile station, wherein the third message comprises the public IP address and a time out value indicating a time in which a binding of public IP address and a private IP address of the mobile station is effective; and
        transmit, to the application server, a fourth message comprising the public IP address and the time out value.

7. The apparatus of claim 6, wherein the at least one processor is configured to:
    determine the gateway connected with the mobile station by using a mobile station ID of the mobile station comprised in the first message; and
    transmit the second message requesting location information of the mobile station to the determined gateway,
    wherein the first message and second message comprise at least one of the mobile station ID, a private port number of the mobile station.

8. The apparatus of claim 6, wherein the third message and the fourth message further comprise a public port number of the mobile station.

9. The apparatus of claim 8, wherein the at least one processor is further configured to:
    in case of receiving a notification message indicating that the mobile station has moved, determine a target gateway to be connected with the mobile station by using a mobile station ID of the mobile station comprised in the notification message;
    transmit, to the target gateway, the second message requesting the NAT table entry of the mobile station;
    receive, from the target gateway, the third message for the NAT table entry of the mobile station; and
    transmit, to the application server, the fourth message about the query of the public IP address of the mobile station.

10. The apparatus of claim 6, wherein the public IP address of the mobile station is configured to enable transmission of data from the application server to the mobile station.

11. An apparatus for operating a gateway in a communication system, the apparatus comprising:
    a memory;
    a communication processing unit communicating with another node; and
    at least one processor operatively coupled to the communication processing unit, wherein at least one processor is configured to:
        receive a second message requesting a network address translation (NAT) table entry of a mobile station from a location register through the communication processing unit;
        obtain a private internet protocol (IP) address of the mobile station;
        allocate a public IP address for the private IP address; enter the mobile station in a NAT table; and
        transmit, to the location register, a third message for the NAT table entry of the mobile station, wherein the third message comprises the public IP address and a time out value indicating a time in which a binding of the public IP address and the private IP address is effective.

12. The apparatus of claim 11, wherein at least one processor is configured to map the private IP address of the mobile station corresponding to a mobile station ID and the public IP address by using the mobile station ID of a mobile station comprised in a first message, and
wherein the first message comprises at least one of the mobile station ID of the mobile station, a private port.

13. The apparatus of claim 11, wherein the third message further comprises at least one of a mobile station ID and a public port number of the mobile station.

14. The apparatus of claim 11, wherein the at least one processor is further configured to perform a detachment process with the mobile station in response to the mobile station performing a handover.

15. The apparatus of claim 11, wherein the at least one processor is further configured to:
transmit, to the location register, a notification message indicating that the mobile station has moved.

\* \* \* \* \*